US012661656B2

(12) United States Patent
Wu et al.

(10) Patent No.: US 12,661,656 B2
(45) Date of Patent: Jun. 23, 2026

(54) MICRO-REGIONAL THERMAL CONTROL FOR DIGITAL MICROFLUIDICS

(71) Applicant: Baebies, Inc., Durham, NC (US)

(72) Inventors: Daniel Wu, Durham, NC (US); Rainer Ng, Durham, NC (US); Greg Smith, Durham, NC (US); Vijay Srinivasan, Durham, NC (US); Vamsee Pamula, Durham, NC (US)

(73) Assignee: Baebies, Inc., Durham, NC (US)

( * ) Notice: Subject to any disclaimer, the term of this patent is extended or adjusted under 35 U.S.C. 154(b) by 0 days.

(21) Appl. No.: 18/526,477

(22) Filed: Dec. 1, 2023

(65) Prior Publication Data

US 2024/0109071 A1 Apr. 4, 2024

Related U.S. Application Data

(63) Continuation of application No. PCT/US2022/031938, filed on Jun. 2, 2022.

(Continued)

(51) Int. Cl.

| | |
|---|---|
| ***C12Q 1/68*** | (2018.01) |
| ***B01L 3/00*** | (2006.01) |
| ***B01L 7/00*** | (2006.01) |

(52) U.S. Cl.

CPC ......... *B01L 7/525* (2013.01); *B01L 3/502792* (2013.01); *B01L 2200/16* (2013.01);

(Continued)

(58) Field of Classification Search

None

See application file for complete search history.

(56) References Cited

U.S. PATENT DOCUMENTS

| | | | | |
|---|---|---|---|---|
| 7,851,184 B2 * | 12/2010 | Pollack ................ | C12Q 1/6869 435/91.2 |
| 8,951,732 B2 * | 2/2015 | Pollack ................ | C12Q 1/6846 435/6.12 |

(Continued)

FOREIGN PATENT DOCUMENTS

WO 2009140373 A2 11/2009

OTHER PUBLICATIONS

Wang et al. (J Micromech Microeng, 2005, 15:1369-1377) (Year: 2005).*

(Continued)

*Primary Examiner* — Stephanie K Mummert

(74) *Attorney, Agent, or Firm* — E. Eric Mills; Nicholas P. Stadnyk; Maynard Nexsen PC

(57) ABSTRACT

A method of thermal cycling a droplet, including providing a droplet actuator with heaters establishing a first thermal zone and second thermal zone in a substantially oil-filled droplet operations gap; a thermal cycling path comprising droplet operations electrodes comprising a first droplet operations electrode in the first thermal zone and a second droplet operations electrode in the second thermal zone, wherein the first and second droplet operations electrodes are within 5 mm of each other; a first temperature at the first droplet operations electrode and a second temperature at the second droplet operations electrode, wherein the first and second temperatures differ by at least about 10° C.; and using the droplet operations electrodes, transporting the droplet in a cycling pattern for multiple cycles along the thermal cycling path between the first droplet operations electrode and the second droplet operations electrode. Cartridges and systems are also provided.

30 Claims, 24 Drawing Sheets

Related U.S. Application Data

(60) Provisional application No. 63/195,912, filed on Jun. 2, 2021.

(52) U.S. Cl.
CPC .................. *B01L 2300/0636* (2013.01); *B01L 2300/0663* (2013.01); *B01L 2300/1805* (2013.01)

(56) References Cited

U.S. PATENT DOCUMENTS

| | | | | |
|---|---|---|---|---|
| 9,376,713 | B2 * | 6/2016 | Bashir | B03C 5/026 |
| 11,207,686 | B2 * | 12/2021 | Anderson | B01L 3/502792 |
| 2008/0299651 | A1 | 12/2008 | Atwood et al. | |
| 2013/0217103 | A1 | 8/2013 | Bauer | |
| 2013/0288254 | A1 * | 10/2013 | Pollack | G01N 27/447 435/6.12 |
| 2015/0375229 | A1 | 12/2015 | Possinger et al. | |
| 2016/0161343 | A1 * | 6/2016 | Smith | G01K 7/16 374/185 |
| 2016/0296934 | A1 | 10/2016 | Dong et al. | |
| 2019/0176153 | A1 | 6/2019 | Yang et al. | |
| 2020/0171501 | A1 | 6/2020 | McEwen et al. | |

OTHER PUBLICATIONS

Prakash et al. (Journal of the Electrohemical Society, 2014, 161(2):B3083-B3093) (Year: 2014).*
Ugsornrat et al. (Sensors and Materials, 2010, 22(6):271-284) (Year: 2010).*
Chou et al. (Inventions 2017, 2, 3, p. 1-8) (Year: 2017).*
International Search Report and Written Opinion issued in counterpart PCT Application No. PCT/US2022/031938 dated Sep. 12, 2022 (twenty-five (25) pages).
Zipeng Li et al: "Optimization of 3D Digital Microfluidic Biochips for the Multiplexed Polymerase Chain Reaction", ACM Transactions on Design Automation of Electronic Systems, ACM, New York, NY, US, vol. 21, No. 2, Jan. 28, 2016 (Jan. 28, 2016), pp. 1-27, XP058077771, ISSN: 1084-4309, DOI: 10.1145/2811259.

* cited by examiner

Thermal Response To Heating

Edge Effect Spatial Heating

1500

1600

MICRO-REGIONAL THERMAL CONTROL FOR DIGITAL MICROFLUIDICS

RELATED APPLICATIONS

The presently-disclosed subject matter is a 35 U.S.C. § 111 continuation application of International Patent Application No. PCT/US2022/031938 having an international filing date of Jun. 2, 2022, which is related and claims priority to U.S. Provisional Patent Application No. US/63/195912, entitled "Digital Microfluidics System, Cartridge, and Method Including Integrated Heaters and Sensors for Micro-regional Thermal Control," filed on Jun. 2, 2021, the entire disclosures of which are incorporated by reference.

GOVERNMENT RIGHTS

This invention was made with government support under Grant No. DC016576, entitled "Rapid, Near-Patient Nucleic Acid Testing for Congenital Cytomegalovirus (CMV) Testing," awarded by the National Institutes of Health (NIH). The government has certain rights in the invention.

FIELD OF THE INVENTION

The invention relates generally to thermal control in digital microfluidics (DMF) cartridges and more particularly to a DMF system, cartridge, and method including integrated heaters and sensors for micro-regional thermal control.

BACKGROUND OF THE INVENTION

DMF systems, devices, and/or cartridges are for biochemical assays, including for conducting thermal cycling. There is a need to decrease the space needed to conduct thermal cycling and to increase the rate of thermal cycling to decrease processing time for biochemical assays.

SUMMARY OF THE INVENTION

The invention provides a method of thermal cycling a droplet. The method may include providing a droplet actuator of the invention. The droplet actuator may include heaters establishing a first thermal zone and second thermal zone in a substantially oil-filled droplet operations gap. The droplet actuator may include a thermal cycling path comprising droplet operations electrodes comprising a first droplet operations electrode in the first thermal zone and a second droplet operations electrode in the second thermal zone, wherein the first and second droplet operations electrodes are within 5 mm of each other. The droplet actuator may include a first temperature at the first droplet operations electrode and a second temperature at the second droplet operations electrode, wherein the first and second temperatures differ by at least about 10° C. The method may include using the droplet operations electrodes to transport the droplet in a cycling pattern for multiple cycles along the thermal cycling path between the first droplet operations electrode and the second droplet operations electrode. The droplet may, for example, include reagents for amplifying a nucleic acid. The first temperature may, for example, be a denaturation temperature and the second temperature may be an annealing and extension or elongation temperature. The method may include transporting the droplet in a cycling pattern that results in nucleic acid amplification.

In some embodiments, the droplet actuator may include 2 or more of the thermal cycling path. In some embodiments, the droplet actuator may include 5 or more of the thermal cycling path. In some embodiments, the droplet actuator may include 10 or more of the thermal cycling path.

In some embodiments, the first droplet operations electrode is adjacent to the second droplet operations electrode, without any intervening droplet operations electrode. In some embodiments, the first and second droplet operations electrodes are separated by no more than one additional droplet operations electrode between them. In some embodiments, the first and second droplet operations electrodes are separated by no more than two additional droplet operations electrodes between them.

In some embodiments, each cycle of the multiple cycles may be completed in less than about 6 seconds and effects substantially complete amplification. In some embodiments, each cycle of the multiple cycles is completed in less than about 1 second and effects substantially complete amplification. In some embodiments, each cycle of the multiple cycles is completed in less than about 0.5 seconds and effects substantially complete amplification.

In some embodiments, the thermal cycling path has a length of less than about 5,000 μm. In some embodiments, the thermal cycling path has a length of less than about 1,500 μm. In some embodiments, the thermal cycling path has a length of less than about 5,000 μm. In some embodiments, the thermal cycling path has a length of less than about 1,500 μm. In some embodiments, the thermal cycling path has a length of less than about 500 μm. In some embodiments, the thermal cycling path has a length of less than about 100 μm. In some embodiments, the thermal cycling path has a length of less than about 10 μm.

In some embodiments, transporting the droplet between the first droplet operations electrode and the second droplet operations electrode is accomplished in a time of less than about 1,000 milliseconds. In some embodiments, transporting the droplet between the first droplet operations electrode and the second droplet operations electrode is accomplished in a time of less than about 100 milliseconds. In some embodiments, transporting the droplet between the first droplet operations electrode and the second droplet operations electrode is accomplished in a time of less than about 50 milliseconds. In some embodiments, transporting the droplet between the first droplet operations electrode and the second droplet operations electrode is accomplished in a time of less than about 25 milliseconds. In some embodiments, transporting the droplet between the first droplet operations electrode and the second droplet operations electrode is accomplished in a time of less than about 10 milliseconds. In some embodiments, transporting the droplet between the first droplet operations electrode and the second droplet operations electrode is accomplished in a time of less than about 1 milliseconds. In some embodiments, transporting the droplet between the first droplet operations electrode and the second droplet operations electrode is accomplished in a time of less than about 0.1 milliseconds.

In some embodiments, the first and second temperatures differ by at least about 20° C. In some embodiments, the first and second temperatures differ by at least about 30° C. In some embodiments, the first and second temperatures differ by at least about 40° C. In some embodiments, the first and second temperatures differ by at least about 50° C. In some embodiments, the first and second temperatures are each independently between about 37° C. to about 100° C.

In some embodiments of the method, the first thermal zone is set at a nucleic acid annealing temperature and the second thermal zone is set at a nucleic acid denaturation temperature. The method may, for example, include retaining the droplet at the first droplet operations electrode for a period of about 3 seconds or less. The method may, for example, include retaining the droplet at the first droplet operations electrode for a period of about 500 milliseconds or less. The method may, for example, include retaining the droplet at the first droplet operations electrode for a period of about 0 seconds. The method may, for example, include retaining the droplet at the second droplet operations electrode for a period of about 3 seconds or less. The method may, for example, include retaining the droplet at the second droplet operations electrode for a period of about 500 milliseconds or less. The method may, for example, include comprises retaining the droplet at the second droplet operations electrode for a period of about 0 seconds.

In some embodiments, each cycle may take less than about 6 seconds. In some embodiments, each cycle may take less than about 1 second. In some embodiments, each cycle may take less than about 0.5 seconds. In some embodiments, each cycle may take less than about 100 milliseconds.

The droplet actuator may include heaters that are fabricated in or on a printed circuit board substrate or any other suitable material such as glass, plastic, or silicon substrates that is separated from a separate substrate to form the droplet operations gap. In some embodiments, the heaters may be formed from a resistive material selected from a group consisting of a ceramic material, a ceramic-metal, a metal alloy, and a carbon ink. In some embodiments, the heaters are formed from a metal comprising copper. In some embodiments, the heaters may be arranged such that a first heater is associated with the first droplet operations electrode and establishes the first thermal zone; a second heater is associated with the second droplet operations electrode and establishes the second thermal zone; and a third heater is associated with a boundary region adjacent to either the first and/or the second heater and is set at a temperature selected to maintain the temperature of the respective thermal zone. In some embodiments, the second heater and the third heater may be set at the same temperature. In some embodiments, the second heater and the third heater may be set at a higher temperature than the first heater. In some embodiments, the second heater and the third heater may be set at a denaturation temperature. In some embodiments, the third heater stabilizes the second thermal zone.

The invention provides a droplet actuator for thermal cycling a droplet and amplifying a nucleic acid. The droplet actuator may include heaters establishing a first thermal zone and second thermal zone in a substantially oil-filled droplet operations gap. The droplet actuator may include a thermal cycling path that includes droplet operations electrodes comprising a first droplet operations electrode in the first thermal zone and a second droplet operations electrode in the second thermal zone, wherein the first and second droplet operations electrodes are within 5 mm of each other. The droplet actuator may include a first temperature at the first droplet operations electrode and a second temperature at the second droplet operations electrode, wherein the first and second temperatures differ by at least about 10° C. The droplet actuator may include a droplet on the thermal cycling path comprising reagents for amplifying a nucleic acid; and wherein the first temperature is a denaturation temperature and the second temperature is an elongation temperature; and transporting the droplet in a cycling pattern results in nucleic acid amplification.

In some embodiments, the droplet actuator may include 2 or more of the thermal cycling path. In some embodiments, the droplet actuator may include 5 or more of the thermal cycling path. In some embodiments, the droplet actuator may include 10 or more of the thermal cycling path.

In some embodiments, the first droplet operations electrode is adjacent to the second droplet operations electrode, without any intervening droplet operations electrode. In some embodiments, the first and second droplet operations electrodes are separated by no more than one additional droplet operations electrode between them which may be smaller, same size, or larger than the first and second droplet operations electrodes. In some embodiments, the first and second droplet operations electrodes are separated by no more than two additional droplet operations electrodes between them.

In some embodiments, the first and second temperatures differ by at least about 20° C. In some embodiments, the first and second temperatures differ by at least about 30° C. In some embodiments, the first and second temperatures differ by at least about 40° C. In some embodiments, the first and second temperatures differ by at least about 50° C. In some embodiments, the first and second temperatures are each independently between about 37° C. to about 100° C.

The invention provides a system that includes a processor coupled to and controlling droplet operations of a droplet actuator of the invention. In some embodiments, the processor may be programmed to effectuate transport of a droplet along the thermal cycling path to complete a thermal cycle in less than about 20 seconds. In some embodiments, the processor may be programmed to effectuate transport of a droplet along the thermal cycling path to complete a thermal cycle in less than about 15 seconds. In some embodiments, the processor may be programmed to effectuate transport of a droplet along the thermal cycling path to complete a thermal cycle in less than about 10 seconds. In some embodiments, the processor may be programmed to effectuate transport of a droplet along the thermal cycling path such that transport time from the first droplet operations electrode to the second droplet operations electrode is less than about 2 seconds. In some embodiments, the processor may be programmed to effectuate transport of a droplet along the thermal cycling path such that transport time from the first droplet operations electrode to the second droplet operations electrode is less than about 1 seconds. In some embodiments, the processor may be programmed to effectuate transport of a droplet along the thermal cycling path such that the ratio of transport time from the first droplet operations electrode to the second droplet operations electrode or vice versa is less than $1/5^{th}$ of droplet retention time on the destination electrode of the first droplet operations electrode or the second droplet operations electrode. In some embodiments, the processor may be programmed to effectuate transport of a droplet along the thermal cycling path such that the ratio of transport time from the first droplet operations electrode to the second droplet operations electrode or vice versa is less than $1/10^{th}$ of droplet retention time on the destination electrode of the first droplet operations electrode or the second droplet operations electrode. In some embodiments, the processor may be programmed to effectuate transport of a droplet along the thermal cycling path such that the ratio of transport time from the first droplet operations electrode to the second droplet operations electrode or vice versa is less than $1/100^{th}$ of droplet retention time on the destination electrode of the first droplet operations electrode or the second droplet operations electrode.

DETAILED DESCRIPTION OF THE INVENTION

Terminology

Figure 1:
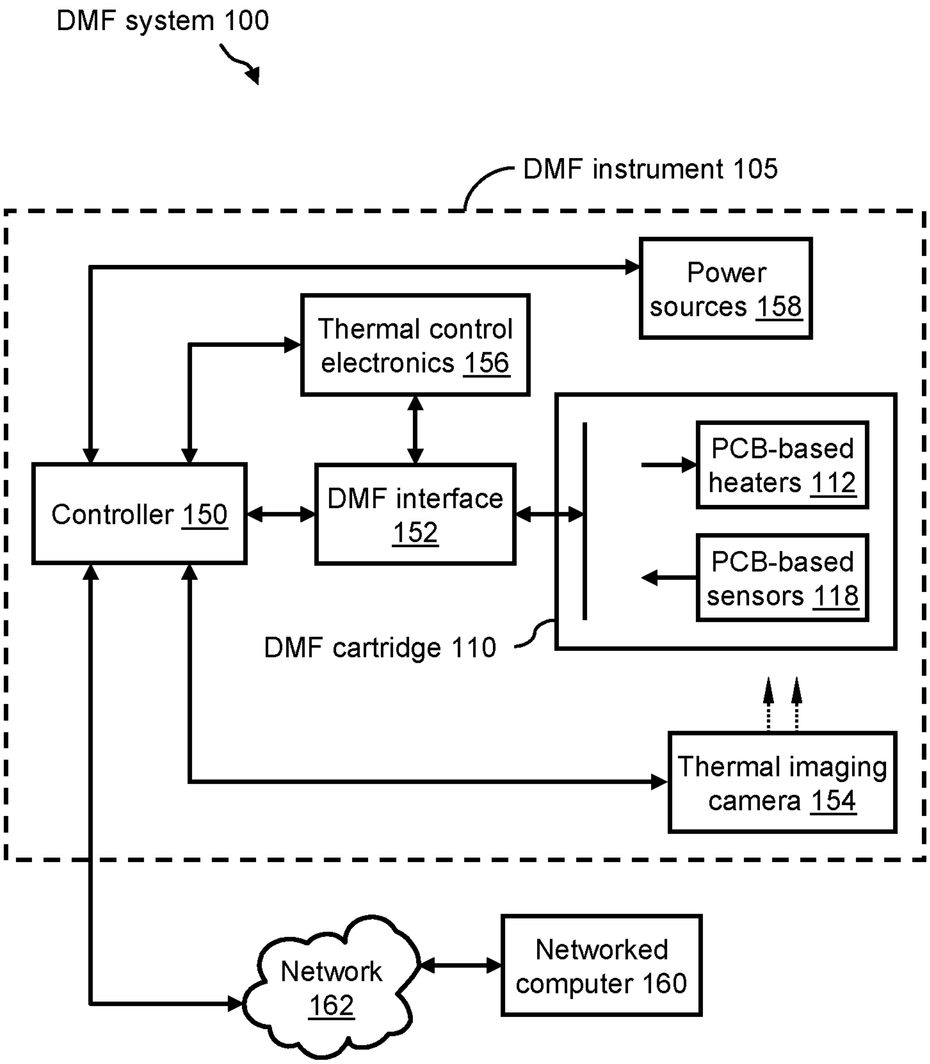
FIG. 1 is a block diagram of an example of the DMF system that includes printed circuit board (PCB)-based heaters and PCB-integrated sensors integrated into a DMF cartridge (or device).

"Activate," with reference to one or more electrodes, means affecting a change in the electrical state of the one or more electrodes which, in the presence of a droplet, results in a droplet operation. Activation of an electrode can be accomplished using alternating current (AC) or direct current (DC). Any suitable voltage may be used. For example, an electrode may be activated using a voltage that is greater than about 5 V, or greater than about 20 V, or greater than about 40 V, or greater than about 100 V, or greater than about 200 V, or greater than about 300 V. The suitable voltage being a function of the dielectric's properties such as thickness and dielectric constant, liquid properties such as viscosity and many other factors as well. Where an AC signal is used, any suitable frequency may be employed. For example, an electrode may be activated using an AC signal having a frequency from about 1 Hz to about 10 MHz, or from about 1 Hz and 10 kHz, or from about 10 Hz to about 240 Hz, or about 60 Hz.

"cCMV" means "congenital cytomegalovirus."

"CMV" means "cytomegalovirus."

"Droplet" means a volume of liquid on a droplet actuator. Typically, a droplet is at least partially bounded by a filler fluid. For example, a droplet may be completely surrounded by filler fluid or may be bounded by filler fluid and one or more surfaces of the droplet actuator. As another example, a droplet may be bounded by filler fluid, one or more surfaces of the droplet actuator, and/or the atmosphere. As yet another example, a droplet may be bounded by filler fluid and the atmosphere. Droplets may, for example, be aqueous or non-aqueous or may be mixtures or emulsions including aqueous and non-aqueous components. Droplets may take a wide variety of shapes; non-limiting examples include generally disc-shaped, slug-shaped, truncated sphere, ellipsoid, spherical, partially-compressed sphere, hemispherical, ovoid, cylindrical, combinations of such shapes, and various shapes formed during droplet operations, such as merging or splitting or formed as a result of contact of such shapes with one or more surfaces of a droplet actuator. For examples of droplet fluids that may be subjected to droplet operations using the approach of the invention, see International Patent Application No. PCT/US 06/47486, entitled, "Droplet-Based Biochemistry," filed on Dec. 11, 2006. In various embodiments, a droplet may include a biological sample, such as whole blood, lymphatic fluid, serum, plasma, sweat, tear, saliva, sputum, cerebrospinal fluid, amniotic fluid, seminal fluid, vaginal excretion, serous fluid, synovial fluid, pericardial fluid, peritoneal fluid, pleural fluid, transudates, exudates, cystic fluid, bile, urine, gastric fluid, intestinal fluid, fecal samples, liquids containing single or multiple cells, liquids containing organelles, fluidized tissues, fluidized organisms, liquids containing multi-celled organisms, biological swabs and biological washes. Moreover, a droplet may include a reagent, such as water, deionized water, saline solutions, acidic solutions, basic solutions, detergent solutions and/or buffers. Other examples of droplet contents include reagents, such as a reagent for a biochemical protocol, such as a nucleic acid amplification protocol, an affinity-based assay protocol, an enzymatic assay protocol, a sequencing protocol, and/or a protocol for analyses of biological fluids. A droplet may include one or more beads.

"Droplet Actuator" means a device for manipulating droplets. For examples of droplet actuators, see Pamula et al., U.S. Pat. No. 6,911,132, entitled "Apparatus for Manipulating Droplets by Electrowetting-Based Techniques," issued on Jun. 28, 2005; Pamula et al., U.S. patent application Ser. No. 11/343,284, entitled "Apparatuses and Methods for Manipulating Droplets on a Printed Circuit Board," filed on filed on Jan. 30, 2006; Pollack et al., International Patent Application No. PCT/US2006/047486, entitled "Droplet-Based Biochemistry," filed on Dec. 11, 2006; Shenderov, U.S. Pat. No. 6,773,566, entitled "Electrostatic Actuators for Microfluidics and Methods for Using Same," issued on Aug. 10, 2004 and U.S. Pat. No. 6,565,727, entitled "Actuators for Microfluidics Without Moving Parts," issued on Jan. 24, 2000; Kim and/or Shah et al., U.S. patent application Ser. No. 10/343,261, entitled "Electrowetting-driven Micropumping," filed on Jan. 27, 2003, Ser. No. 11/275,668, entitled "Method and Apparatus for Promoting the Complete Transfer of Liquid Drops from a Nozzle," filed on Jan. 23, 2006, Ser. No. 11/460,188, entitled "Small Object Moving on Printed Circuit Board," filed on Jan. 23, 2006, Ser. No. 12/465,935, entitled "Method for Using Magnetic Particles in Droplet Microfluidics," filed on May 14, 2009, and Ser. No. 12/513,157, entitled "Method and Apparatus for Real-time Feedback Control of Electrical Manipulation of Droplets on Chip," filed on Apr. 30, 2009; Velev, U.S. Pat. No. 7,547,380, entitled "Droplet Transportation Devices and Methods Having a Fluid Surface," issued on Jun. 16, 2009; Sterling et al., U.S. Pat. No. 7,163,612, entitled "Method, Apparatus and Article for Microfluidic Control via Electrowetting, for Chemical, Biochemical and Biological Assays and the Like," issued on Jan. 16, 2007; Becker and Gascoyne et al., U.S. Pat. No. 7,641,779, entitled "Method and Apparatus for Programmable fluidic Processing," issued on Jan. 5, 2010, and U.S. Pat. No. 6,977,033, entitled "Method and Apparatus for Programmable fluidic Processing," issued on Dec. 20, 2005; Decre et al., U.S. Pat. No. 7,328,979, entitled "System for Manipulation of a Body of Fluid," issued on Feb. 12, 2008; Yamakawa et al., U.S. Patent Pub. No. 20060039823, entitled "Chemical Analysis Apparatus," published on Feb. 23, 2006; Wu, International Patent Pub. No. WO/2009/003184, entitled "Digital Microfluidics Based Apparatus for Heat-exchanging Chemical Processes," published on Dec. 31, 2008; Fouillet et al., U.S. Patent Pub. No. 20090192044, entitled "Electrode Addressing Method," published on Jul. 30, 2009; Fouillet et al., U.S. Pat. No. 7,052,244, entitled "Device for Displacement of Small Liquid Volumes Along a Micro-catenary Line by Electrostatic Forces," issued on May 30, 2006; Marchand et al., U.S. Patent Pub. No. 20080124252, entitled "Droplet Microreactor," published on May 29, 2008; Adachi et al., U.S. Patent Pub. No. 20090321262, entitled "Liquid Transfer Device," published on Dec. 31, 2009; Roux et al., U.S. Patent Pub. No. 20050179746, entitled "Device for Controlling the Displacement of a Drop Between two or Several Solid Substrates," published on Aug. 18, 2005; Dhindsa et al., "Virtual Electrowetting Channels: Electronic Liquid Transport with Continuous Channel Functionality," Lab Chip, 10:832-836 (2010); the entire disclosures of which are incorporated herein by reference, along with their priority documents. Certain droplet actuators will include one or more substrates arranged with a droplet operations gap therebetween and electrodes associated with (e.g., layered on, attached to, and/or embedded in) the one or more substrates and arranged to conduct one or more droplet operations. For example, certain droplet actuators will include a base (or bottom) substrate, droplet operations electrodes associated with the substrate, one or more dielectric layers atop the substrate and/or electrodes, and optionally one or more hydrophobic layers atop the substrate, dielectric layers and/or the electrodes forming a droplet operations surface. A top substrate may also be provided, which is separated from the droplet operations surface by a gap, commonly referred to as a droplet operations gap. Various electrode arrangements on the top and/or bottom substrates are discussed in the above-referenced patents and applications and certain novel electrode arrangements are discussed in the description of the invention. During droplet operations, it is preferred that droplets remain in continuous contact or frequent contact with a ground or reference electrode. A ground or reference electrode may be associated with the top substrate facing the gap, the bottom substrate facing the gap, and/or in the gap. Where electrodes are provided on both substrates, electrical contacts for coupling the electrodes to a droplet actuator instrument for controlling or monitoring the electrodes may be associated with one or both plates. In some cases, electrodes on one substrate are electrically coupled to the other substrate so that only one substrate is in contact with the droplet actuator. In one embodiment, a conductive material (e.g., an epoxy, such as MASTER BOND™ Polymer System EP79, available from Master Bond, Inc., Hackensack, NJ) provides the electrical connection between electrodes on one substrate and electrical paths on the other substrates, e.g., a ground electrode on a top substrate may be coupled to an electrical path on a bottom substrate by such a conductive material. Where multiple substrates are used, a spacer may be provided between the substrates to determine the height of the gap therebetween and define on-actuator dispensing reservoirs. The spacer height may, for example, be from about 5 μm to about 1000 μm, or about 100 μm to about 400 μm, or about 200 μm to about 350 μm, or about 250 μm to about 300 μm, or about 275 μm. The spacer may, for example, be formed of a layer of projections from the top or bottom substrates, and/or a material inserted between the top and bottom substrates. One or more openings may be provided in the one or more substrates for forming a fluid path through which liquid may be delivered into the droplet operations gap. The one or more openings may in some cases be aligned for interaction with one or more electrodes, e.g., aligned such that liquid flowing through the opening will come into sufficient proximity with one or more droplet operations electrodes to permit a droplet operation to occur by the droplet operations electrodes using the liquid. The base (or bottom) and top substrates may in some cases be formed as one integral component. One or more reference electrodes may be provided on the base (or bottom) and/or top substrates and/or in the gap. Examples of reference electrode arrangements are provided in the above referenced patents and patent applications. In various embodiments, the manipulation of droplets by a droplet actuator may be electrode mediated, e.g., electrowetting mediated or dielectrophoresis mediated or Coulombic force mediated. Examples of other techniques for controlling droplet operations that may be used in the droplet actuators of the invention include using devices that induce hydrodynamic fluidic pressure, such as those that operate on the basis of mechanical principles (e.g. external syringe pumps, pneumatic membrane pumps, vibrating membrane pumps, vacuum devices, centrifugal forces, piezoelectric/ultrasonic pumps and acoustic forces); electrical or magnetic principles (e.g. electroosmotic flow, electrokinetic pumps, ferrofluidic plugs, electrohydrodynamic pumps, attraction or repulsion using magnetic forces and magnetohydrodynamic pumps); thermodynamic principles (e.g. gas bubble generation/phase-change-induced volume expansion); other kinds of surface-wetting principles (e.g. electrowetting, and opto-electrowetting, as well as chemically, thermally, structurally and radioactively induced surface-tension gradients); gravity; surface tension (e.g., capillary action); electrostatic forces (e.g., electroosmotic flow); centrifugal flow (substrate disposed on a compact disc and rotated); magnetic forces (e.g., oscillating ions causing flow); magnetohydrodynamic forces; and vacuum or pressure differential. In certain embodiments, combinations of two or more of the foregoing techniques may be employed to conduct a droplet operation in a droplet actuator of the invention. Similarly, one or more of the foregoing may be used to deliver liquid into a droplet operations gap, e.g., from a reservoir in another device or from an external reservoir of the droplet actuator (e.g., a reservoir associated with a droplet actuator substrate and a flow path from the reservoir into the droplet operations gap). Droplet operations surfaces of certain droplet actuators of the invention may be made from hydrophobic materials or may be coated or treated to make them hydrophobic. For example, in some cases, some portion or all of the droplet operations surfaces may be derivatized with low surface-energy materials or chemistries, e.g., by deposition or using in situ synthesis using compounds such as poly- or per-fluorinated compounds in solution or polymerizable monomers. Examples include TEFLON® AF (available from DuPont, Wilmington, DE), members of the CYTOP® family of materials, coatings in the FLUOROPEL® family of hydrophobic and superhydrophobic coatings (available from Cytonix Corporation, Beltsville, MD), silane coatings, fluorosilane coatings, hydrophobic phosphonate derivatives (e.g. those sold by Aculon, Inc), and NOVEC™ electronic coatings (available from 3M Company, St. Paul, MN), other fluorinated monomers for plasma-enhanced chemical vapor deposition (PECVD), and organosiloxane (e.g., SiOC) for PECVD. In some cases, the droplet operations surface may include a hydrophobic coating having a thickness ranging from about 10 nm to about 1,000 nm. Moreover, in some embodiments, the top substrate of the droplet actuator includes an electrically conducting organic polymer, which is then coated with a hydrophobic coating or otherwise treated to make the droplet operations surface hydrophobic. For example, the electrically conducting organic polymer deposited onto a plastic substrate may be poly(3,4-ethylenedioxythiophene) poly(styrenesulfonate) (PEDOT:PSS). Other examples of electrically conducting organic polymers and alternative conductive layers are described in Pollack et al., International Patent Application No. PCT/US2010/040705, entitled "Droplet Actuator Devices and Methods," the entire disclosure of which is incorporated herein by reference. One or both substrates may be fabricated using a printed circuit board (PCB), glass, indium tin oxide (ITO)-coated glass, and/or semiconductor materials as the substrate. When the substrate is ITO-coated glass, the ITO coating is preferably a thickness in the range of about 20 nm to about 200 nm, preferably about 50 nm to about 150 nm, or about 75 nm to about 125 nm, or about 100 nm. In some cases, the top and/or bottom substrate includes a PCB substrate that is coated with a dielectric, such as a polyimide dielectric, which may in some cases also be coated or otherwise treated to make the droplet operations surface hydrophobic. When the substrate includes a PCB, the following materials are examples of suitable materials: MITSUI™ BN-300 (available from MITSUI Chemicals America, Inc., San Jose CA); ARLON™ 11N (available from Arlon, Inc, Santa Ana, CA); NELCO® N4000-6 and N5000-30/32 (available from Park Electrochemical Corp., Melville, NY); ISOLA™ FR406 (available from Isola Group, Chandler, AZ), especially IS620; fluoropolymer family (suitable for fluorescence detection since it has low background fluorescence); polyimide family; polyester; polyethylene naphthalate; polycarbonate; polyetheretherketone; liquid crystal polymer; cyclo-olefin copolymer (COC); cyclo-olefin polymer (COP); aramid; THERMOUNT® nonwoven aramid reinforcement (available from DuPont, Wilmington, DE); NOMEX® brand fiber (available from DuPont, Wilmington, DE); and paper. Various materials are also suitable for use as the dielectric component of the substrate. Examples include: vapor deposited dielectric, such as PARYLENE™ C, PARYLENE™ N, PARYLENE™ F and PARYLENE™ HT (for high temperature, ~300° C.) (available from Parylene Coating Services, Inc., Katy, TX); TEFLON® AF coatings; CYTOP®; soldermasks, such as liquid photoimageable soldermasks (e.g., on PCB) like TAIYO™ PSR4000 series, TAIYO™ PSR and AUS series (available from Taiyo America, Inc. Carson City, NV) (good thermal characteristics for applications involving thermal control), and PROBIMER™ 8165 (good thermal characteristics for applications involving thermal control (available from Huntsman Advanced Materials Americas Inc., Los Angeles, CA); dry film soldermask, such as those in the VACREL® dry film soldermask line (available from DuPont, Wilmington, DE); film dielectrics, such as polyimide film (e.g., KAPTON® polyimide film, available from DuPont, Wilmington, DE), polyethylene, and fluoropolymers (e.g., FEP), polytetrafluoroethylene; polyester; polyethylene naphthalate; cyclo-olefin copolymer (COC); cyclo-olefin polymer (COP); any other PCB substrate material listed above; black matrix resin; polypropylene; and black flexible circuit materials, such as DuPont™ Pyralux® HXC and DuPont™ Kapton® MBC (available from DuPont, Wilmington, DE). Droplet transport voltage and frequency may be selected for performance with reagents used in specific assay protocols. Design parameters may be varied, e.g., number and placement of on-actuator reservoirs, number of independent electrode connections, size (volume) of different reservoirs, placement of magnets/bead washing zones, electrode size, electrode shape, inter-electrode spacing, and gap height (between the top and bottom substrates) may be varied for use with specific reagents, protocols, droplet volumes, etc. In some cases, a substrate of the invention may be derivatized with low surface-energy materials or chemistries, e.g., using deposition or in situ synthesis using poly- or per-fluorinated compounds in solution or polymerizable monomers. Examples include TEFLON® AF coatings and FLUOROPEL® coatings for dip or spray coating, other fluorinated monomers for plasma-enhanced chemical vapor deposition (PECVD), and organosiloxane (e.g., SiOC) for PECVD. Additionally, in some cases, some portion or all of the droplet operations surface may be coated with a substance for reducing background noise, such as background fluorescence from a PCB substrate. For example, the noise-reducing coating may include a black matrix resin, such as the black matrix resins available from Toray Industries, Inc., Japan. Electrodes of a droplet actuator are typically controlled by a controller or a processor, which is itself provided as part of a system, which may include processing functions as well as data and software storage and input and output capabilities. Reagents may be provided on the droplet actuator in the droplet operations gap or in a reservoir fluidly coupled to the droplet operations gap. The reagents may be in liquid form, e.g., droplets, or they may be provided in a reconstitutable form in the droplet operations gap or in a reservoir fluidly coupled to the droplet operations gap. Reconstitutable reagents may typically be combined with liquids for reconstitution. An example of reconstitutable reagents suitable for use with the invention includes those described in Meathrel, et al., U.S. Pat. No. 7,727,466, entitled "Disintegratable films for diagnostic devices," granted on Jun. 1, 2010. Impedance or capacitance sensing or imaging techniques may sometimes be used to determine or confirm the outcome of a droplet operation. Examples of such techniques are described in Stunner et al., International Patent Pub. No. WO/2008/101194, entitled "Capacitance Detection in a Droplet Actuator," published on Aug. 21, 2008, the entire disclosure of which is incorporated herein by reference. Generally speaking, the sensing or imaging techniques may be used to confirm the presence or absence of a droplet at a specific electrode. For example, the presence of a dispensed droplet at the destination electrode following a droplet dispensing operation confirms that the droplet dispensing operation was effective. Similarly, the presence of a droplet at a detection spot at an appropriate step in an assay protocol may confirm that a previous set of droplet operations has successfully produced a droplet for detection. A "DMF cartridge" is a droplet actuator configured to operate in a system of the invention.

"Droplet operation" means any manipulation of a droplet on a droplet actuator. A droplet operation may, for example, include: loading a droplet into the droplet actuator; dispensing one or more droplets from a source droplet; splitting, separating, or dividing a droplet into two or more droplets; transporting a droplet from one location to another in any direction; merging or combining two or more droplets into a single droplet; diluting a droplet; mixing a droplet; agitating a droplet; deforming a droplet; retaining a droplet in position; incubating a droplet; heating a droplet; vaporizing a droplet; cooling a droplet; disposing of a droplet; transporting a droplet out of a droplet actuator; other droplet operations described herein; and/or any combination of the foregoing. Droplet operations may be electrode-mediated. In some cases, droplet operations are further facilitated by the use of hydrophilic and/or hydrophobic regions on surfaces and/or by physical obstacles. Droplet transport time can be quite fast. For example, in various embodiments, transport of a droplet from one electrode to the next may be completed within about 1 sec, or about 0.1 sec, or about 0.01 sec, or about 0.001 sec. In one embodiment, the electrode is operated in AC mode but is switched to DC mode for imaging. It is helpful for conducting droplet operations that the footprint area of a droplet to be similar to or larger than the electrowetting area; in other words, 1×-, 2×-3×-droplets are usefully controlled using 1, 2, and 3 electrodes, respectively. If the droplet footprint is greater than the number of electrodes available for conducting a droplet operation at a given time, then the difference between the droplet size and the number of electrodes should typically not be greater than 1; in other words, a 2× droplet is usefully controlled using 1 electrode and a 3× droplet is usefully controlled using 2 electrodes. When droplets include beads, it is useful for droplet size to be equal to the number of electrodes controlling the droplet, e.g., transporting the droplet.

"Merge," "merging," "combine," "combining" and the like are used to describe the creation of one droplet from two or more droplets. It should be understood that when such a term is used in reference to two or more droplets, any combination of droplet operations that are sufficient to result in the combination of the two or more droplets into one droplet may be used. For example, "merging droplet A with droplet B," can be achieved by transporting droplet A into contact with a stationary droplet B, transporting droplet B into contact with a stationary droplet A, or transporting droplets A and B into contact with each other.

"Splitting," "separating," and "dividing" and the like are used to describe the creation of more than one droplet from at least one or more droplets. These terms are not intended to imply any particular outcome with respect to the volume of the resulting droplets (i.e., the volume of the resulting droplets can be the same or different) or the number of resulting droplets (the number of resulting droplets may be 2, 3, 4, 5 or more).

"Mixing" refers to droplet operations that result in a more homogenous distribution of one or more components within a droplet. Examples of "loading" droplet operations include microdialysis loading, pressure-assisted loading, robotic loading, passive loading, and pipette loading.

"Shuttling" or "cycling" means using droplet operations, such as electrowetting mediate droplet transport operations, to move a droplet repeatedly between two or more locations on a droplet actuator. Shuttling may be back and forth between two or more locations and/or may include repeated transport around one or more loops to repeatedly deliver the droplet to two or more locations. The locations may, for example, be thermal zones, detection zones, or the like. The path of the shuttling or cycling may sometimes be referred to as a "shuttling path" or a "cycling path".

"Filler fluid" means a fluid associated with a droplet operations substrate of a droplet actuator, which fluid is sufficiently immiscible with a droplet phase to render the droplet phase subject to electrode-mediated droplet operations. For example, the droplet operations gap of a droplet actuator is typically filled with a filler fluid. The filler fluid may, for example, be or include a low-viscosity oil, such as silicone oil or hexadecane filler fluid. The filler fluid may be or include a halogenated oil, such as a fluorinated or perfluorinated oil. The filler fluid may fill the entire gap of the droplet actuator or may coat one or more surfaces of the droplet actuator. Filler fluids may be selected to improve droplet operations and/or reduce the loss of reagent or target substances from droplets, improve the formation of microdroplets, reduce the cross-contamination between droplets, reduce contamination of droplet actuator surfaces, reduce degradation of droplet actuator materials, etc. For example, filler fluids may be selected for compatibility with droplet actuator materials. As an example, fluorinated filler fluids may be usefully employed with fluorinated surface coatings. Fluorinated filler fluids are useful to reduce loss of lipophilic compounds, such as umbelliferone substrates like 6-hexadecanoylamido-4-methylumbelliferone substrates (e.g., for use in Krabbe, Niemann-Pick, or other assays); other umbelliferone substrates are described in U.S. Patent Pub. No. 20110118132, published on May 19, 2011, the entire disclosure of which is incorporated herein by reference. Examples of suitable fluorinated oils include those in the Galden line, such as Galden HT170 (bp=170° C., viscosity=1.8 cSt, density=1.77 g/cm$^3$ at 20° C.), Galden HT200 (bp=200° C., viscosity=2.4 cSt, d=1.79 g/cm$^3$ at 20° C.), Galden HT230 (bp=230° C., viscosity=4.4 cSt, d=1.82 g/cm$^3$ at 20° C.) (all from Solvay Solexis); those in the Novec line, such as Novec 7500 (bp=128 C, viscosity=0.8 cSt, d=1.61 g/cm$^3$), Fluorinert FC-40 (bp=155° C., viscosity=1.8 cSt, d=1.85 g/cm$^3$), Fluorinert FC-43 (bp=174° C., viscosity=2.5 cSt, d=1.86 g/cm$^3$) (both from 3M). In general, the selection of perfluorinated filler fluids is based on kinematic viscosity (<7 cSt is preferred, but not required), and on boiling point (>150° C. is preferred, but not required, for use in DNA/RNA-based applications (PCR, etc.)).

"Prime editing" means an adaptable and specific genome editing method that directly inscribes new genetic information into a specified DNA site.

"PCR" means "polymerase chain reaction."

"qPCR" means "quantitative polymerase chain reaction."

"Reservoir" means an enclosure or partial enclosure configured for holding, storing, or supplying liquid.

A droplet actuator system of the invention may include on-cartridge reservoirs and/or off-cartridge reservoirs. On-cartridge reservoirs may be (1) on-actuator reservoirs, which are reservoirs in the droplet operations gap or on the droplet operations surface; (2) off-actuator reservoirs, which are reservoirs on the droplet actuator cartridge, but outside the droplet operations gap, and not in contact with the droplet operations surface; or (3) hybrid reservoirs which have on-actuator regions and off-actuator regions. An example of an off-actuator reservoir is a reservoir in the top substrate. An off-actuator reservoir is typically in fluid communication with an opening or flow path arranged for flowing liquid from the off-actuator reservoir into the droplet operations gap, such as into an on-actuator reservoir. An off-cartridge reservoir may be a reservoir that is not part of the droplet actuator cartridge at all, but which flows liquid to some portion of the droplet actuator cartridge. For example, an off-cartridge reservoir may be part of a system or docking station to which the droplet actuator cartridge is coupled during operation. Similarly, an off-cartridge reservoir may be a reagent storage container or syringe which is used to force fluid into an on-cartridge reservoir or into a droplet operations gap. A system using an off-cartridge reservoir will typically include a fluid passage means whereby liquid may be transferred from the off-cartridge reservoir into an on-cartridge reservoir or into a droplet operations gap.

"Washing" with respect to washing a surface, such as a hydrophilic surface, means reducing the amount and/or concentration of one or more substances in contact with the surface or exposed to the surface from a droplet in contact with the surface. The reduction in the amount and/or concentration of the substance may be partial, substantially complete, or even complete. The substance may be any of a wide variety of substances; examples include target substances for further analysis, and unwanted substances, such as components of a sample, contaminants, and/or excess reagent or buffer.

"Top," "bottom," "over," "under," and "on" are used throughout the description with reference to the relative positions of components of the droplet actuator, such as the relative positions of top and bottom substrates of the droplet actuator. It will be appreciated that in many cases the droplet actuator is functional regardless of its orientation in space. When a liquid in any form (e.g., a droplet or a continuous body, whether moving or stationary) is described as being "on", "at", or "over" an electrode, array, matrix, or surface, such liquid could be either in direct contact with the electrode/array/matrix/surface or could be in contact with one or more layers or films that are interposed between the liquid and the electrode/array/matrix/surface. When a droplet is described as being "on" or "loaded on" a droplet actuator, it should be understood that the droplet is arranged on the droplet actuator in a manner that facilitates using the droplet actuator to conduct one or more droplet operations on the droplet, the droplet is arranged on the droplet actuator in a manner which facilitates sensing of a property of or a signal from the droplet, and/or the droplet has been subjected to a droplet operation on the droplet actuator.

Micro-Regional Thermal Control for Digital Microfluidics

The disclosure provides a digital microfluidics (DMF) system, cartridge, and method including integrated heaters and sensors for micro-regional thermal control. A DMF cartridge (or device) may have integrated heating. Integrated heaters and sensors may be fabricated onto or into a PCB. The PCB may be a substrate of a droplet actuator. The PCB-integrated heaters and PCB-integrated sensors may be configured for micro-regional temperature control within the DMF cartridge (or device). Smith et al., U.S. Patent US20160161343A1, "Methods of On-Actuator Temperature Measurement," is incorporated herein by reference in its entirety, and especially for its teaching concerning heaters and sensors.

FIG. 1 is a block diagram of an example of a DMF system 100 that includes heaters 112 and sensors 118 integrated into a PCB of DMF cartridge (or device) 110. Generally, DMF system 100 provides a heating system on a DMF cartridge with electrowetting capabilities, where the heating system provides (1) closed-loop control, (2) high accuracy, and (3) minimal bias.

DMF cartridge 110 may include one or mor substrates with droplet operations electrodes arranged for conducting droplet operations. DMF system 100 may provide closed-loop control of a heating system with high accuracy and minimal bias.

DMF system 100 may include a controller 150, a DMF interface 152, a thermal imaging camera 154, thermal control (including both heating and sensing) electronics 156, and one or more power sources 158. Controller 150 may be electrically coupled to the various hardware components of DMF system 100, such as to DMF cartridge 110, thermal imaging camera 154, thermal control electronics 156, and power sources 158. Controller 150 may be electrically coupled to DMF cartridge 110 via DMF interface 152, wherein the DMF interface 152 may be, for example, a pluggable interface for connecting mechanically and electrically to a DMF cartridge 110. Together, DMF cartridge 110, controller 150, DMF interface 152, thermal imaging camera 154, thermal control electronics 156, and power sources 158 may comprise a DMF instrument 105.

Controller 150 may, for example, be a general-purpose computer, special purpose computer, personal computer, tablet device, smartphone, smartwatch, microprocessor, or other programmable data processing apparatus. Controller 150 may provide processing capabilities, such as storing, interpreting, and/or executing software instructions, as well as controlling the overall operations of DMF system 100. The software instructions may comprise machine-readable code stored in non-transitory memory that is accessible by controller 150 for the execution of the instructions. Controller 150 may be configured and programmed to control data and/or power aspects of these devices. For example, with respect to DMF cartridge 110, controller 150 may control droplet manipulation by activating and/or deactivating electrodes. Generally, controller 150 may be used for any functions of the DMF system 100. Further, controller 150 may include ultrafast algorithms for controlling any arrangement of PCB-integrated heaters 112.

DMF instrument 105 may be connected to a network. For example, controller 150 may be in communication with a networked computer 160 via a network 162. Networked computer 160 may be, for example, any centralized server or cloud server. Network 162 may be, for example, a local area network (LAN) or wide area network (WAN) for connecting to the internet.

Thermal imaging camera 154 is a type of thermographic camera that renders infrared radiation as visible light. Thermal imaging cameras are used, for example, by firefighters to see areas of heat through smoke, darkness, or heat-permeable barriers. In DMF system 100, thermal imaging camera 154 may be, for example, the FUR ETS320 camera (available from FUR Systems, Sweden) or the Fluke Ti40FT infrared camera.

Thermal control electronics 156 may be provided for controlling the operating temperature of DMF cartridge 110. Thermal control electronics 156 may include, for example, any thermal sensors used for controlling heaters (e.g., Peltier elements and resistive heaters) and/or coolers arranged with respect to the DMF cartridge 110. Thermal control electronics 156 may be used for interfacing with the one or more PCB-integrated heaters 112 and one or more PCB-integrated sensors 118. For example, thermal control electronics 156 may provide the drive circuitry for the one or more PCB-integrated heaters 112 and the control circuitry for the one or more PCB-integrated sensors 118.

The one or more power sources 158 of DMF cartridge 110 may be, for example, one or more rechargeable or non-rechargeable batteries. The one or more power sources 158 supply power to any active components of DMF cartridge 110. In one example, one power source 158 supplies power to the one or more PCB-integrated heaters 112 of DMF cartridge 110, and another power source 158 supplies power to the controller 150, thermal imaging camera 154, and/or thermal control electronics 156.

In DMF system 100 and with respect to PCB-integrated heaters 112, feedback may be used to create a closed-loop control system to optimize droplet actuation rate and verify droplet operations are completed successfully. For example, PCB-integrated sensors 118 and thermal imaging camera 154 may be used as thermal feedback mechanisms from the PCB-integrated heaters 112 to controller 150 and/or to thermal control electronics 156.

Figure 2:
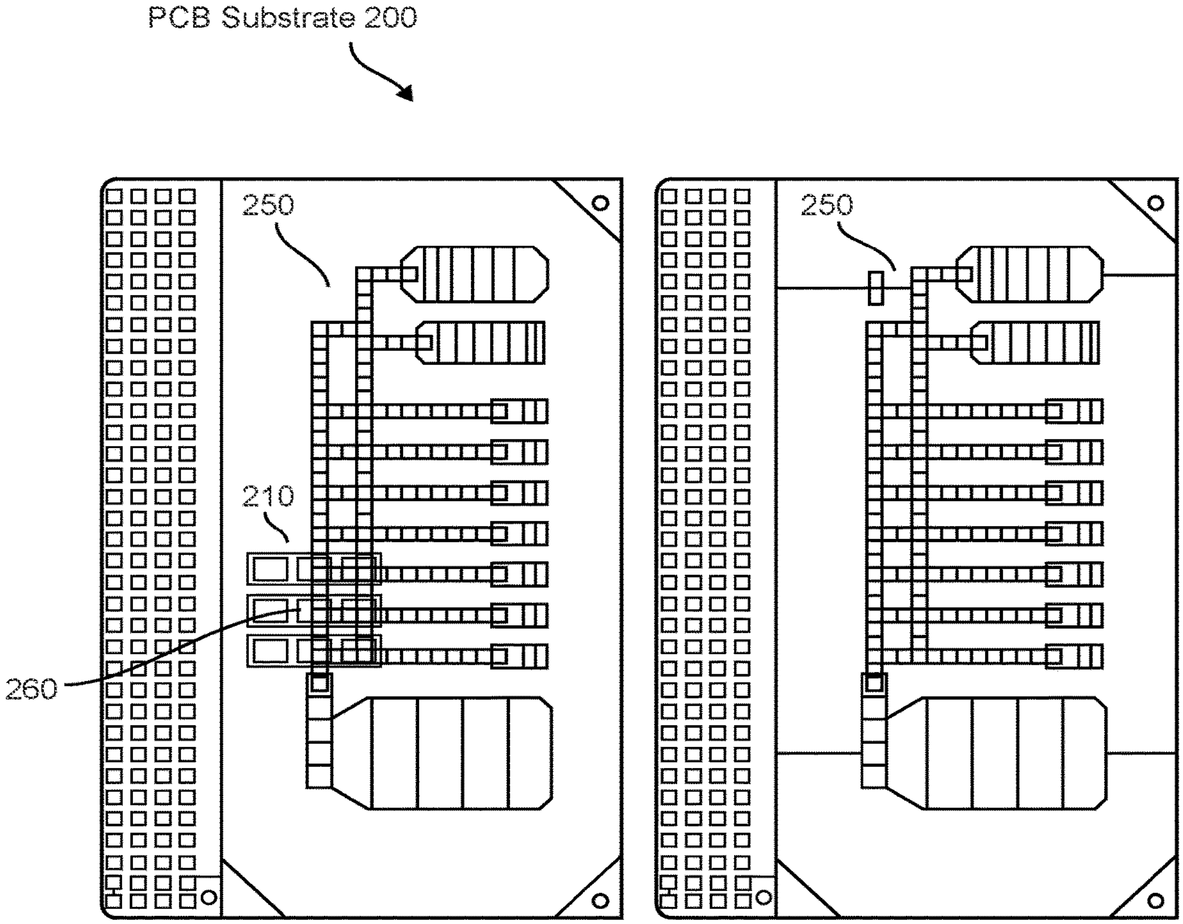
FIG. 2 shows plan views of an example PCB substrate of a DMF cartridge and wherein the PCB substrate may include an integrated heater/sensor arrangement in relation to an electrode configuration.

FIG. 2 shows plan views of an example of a printed circuit board (PCB) substrate 200 of DMF cartridge 110. PCB substrate 200 may include an integrated heater/sensor arrangement in relation to an electrode configuration. Generally, DMF devices consist of two substrates separated by a gap (i.e., a droplet operations gap) that forms a chamber in which the droplet operations are performed. In one example, a DMF device may include a PCB substrate and a glass or plastic surface separated by a gap between the layers. In DMF system 100, PCB substrate 200 may be an example of the PCB substrate of DMF cartridge 110.

PCB substrate 200 may include, for example, an integrated heater/sensor arrangement 210 in relation to an electrode configuration 250. In DMF cartridge 110 for example, electrode configuration 250 may be used for droplet transporting, merging, mixing, splitting, dispensing, diluting, agitating, washing, reconstituting, deforming (shaping), and other types of droplet operations. Further, heater/sensor arrangement 210 may be provided in relation to a detection electrode (or spot) 260 of electrode configuration 250. Heater/sensor arrangement 210 may include, for example, a plurality of PCB-integrated heaters 112 with respective PCB-integrated sensors 118. More details of an example of heater/sensor arrangement 210 and electrode configuration 250 are shown and described herein below with reference to FIG. 3, FIG. 4, and FIG. 5.

Heating System

Figure 3:
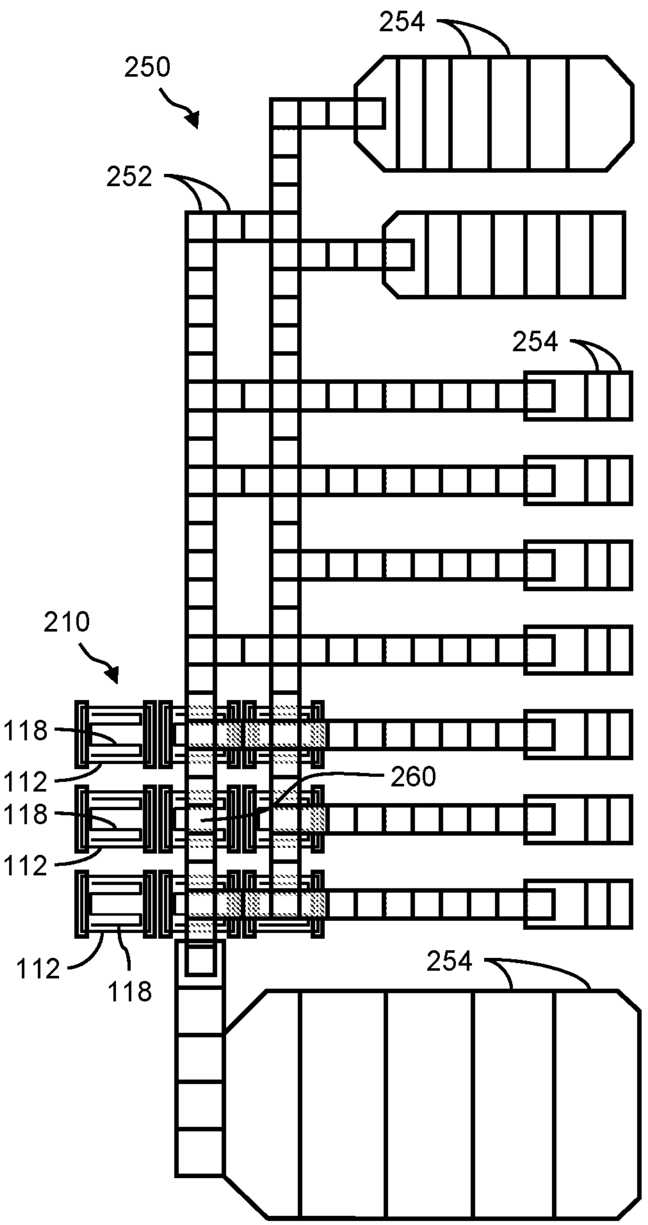
FIG. 3 is a plan view of an example of the integrated heater/sensor arrangement in relation to the electrode configuration shown in FIG. 2.

FIG. 3 is a plan view of an example of the integrated heater/sensor arrangement 210 in relation to electrode configuration 250 as shown in FIG. 2. Electrode configuration 250 may include, for example, various lines, paths, and/or arrays of droplet operations electrodes 252 (i.e., electrowetting electrodes). Further, multiple arrangements of reservoir electrodes 254 supply the various lines, paths, and/or arrays of droplet operations electrodes 252. The multiple arrangements of reservoir electrodes 254 support on-cartridge reservoirs (not shown) of DMF cartridge 110.

In electrode configuration 250, a droplet operations electrode 252 may be designated the detection electrode (or spot) 260. The integrated heater/sensor arrangement 210 may be positioned with respect to detection electrode 260. For example, a heater/sensor arrangement 210 may include a 3×3 arrangement of nine PCB-integrated heaters 112 with their nine respective PCB-integrated sensors 118. In this example, the centermost PCB-integrated heater 112 and PCB-integrated sensor 118 of the 3×3 arrangement substantially aligns with the detection electrode 260.

Accordingly, the 3×3 arrangement of PCB-integrated heaters 112 and PCB-integrated sensors 118 assist to control the temperature at the single detection electrode 260. In this example, the remaining eight PCB-integrated heaters 112 and PCB-integrated sensors 118 around the periphery of the detection electrode 260 (referred to as "boundary heaters") may serve to assist the centermost PCB-integrated heater 112 and PCB-integrated sensor 118 with maintaining a constant temperature at the detection electrode 260.

In another embodiment, there may be 1, 2, 3, 4, 5, 6, 7, 8, 9, 10, or more PCB-integrated heaters situated in any desired arrangement in physical space. In another embodiment, there may be 1, 2, 3, 4, 5, 6, 7, 8, 9, 10, or more PCB-integrated sensors situated in any desired arrangement in physical space. In another embodiment, there may be 1, 2, 3, 4, 5, 6, 7, 8, 9, 10, or more detection electrodes situated in any desired arrangement in physical space.

In another embodiment, the 1, 2, 3, 4, 5, 6, 7, 8, 9, 10, or more PCB-integrated heaters and the 1, 2, 3, 4, 5, 6, 7, 8, 9, 10, or more PCB-integrated sensors and the 1, 2, 3, 4, 5, 6, 7, 8, 9, 10, or more detection electrodes may be arranged in any configuration helpful to precisely control the temperature without encroaching on one another. Many sizes and shapes of heaters, sensors and detectors may be used.

Figure 4A:
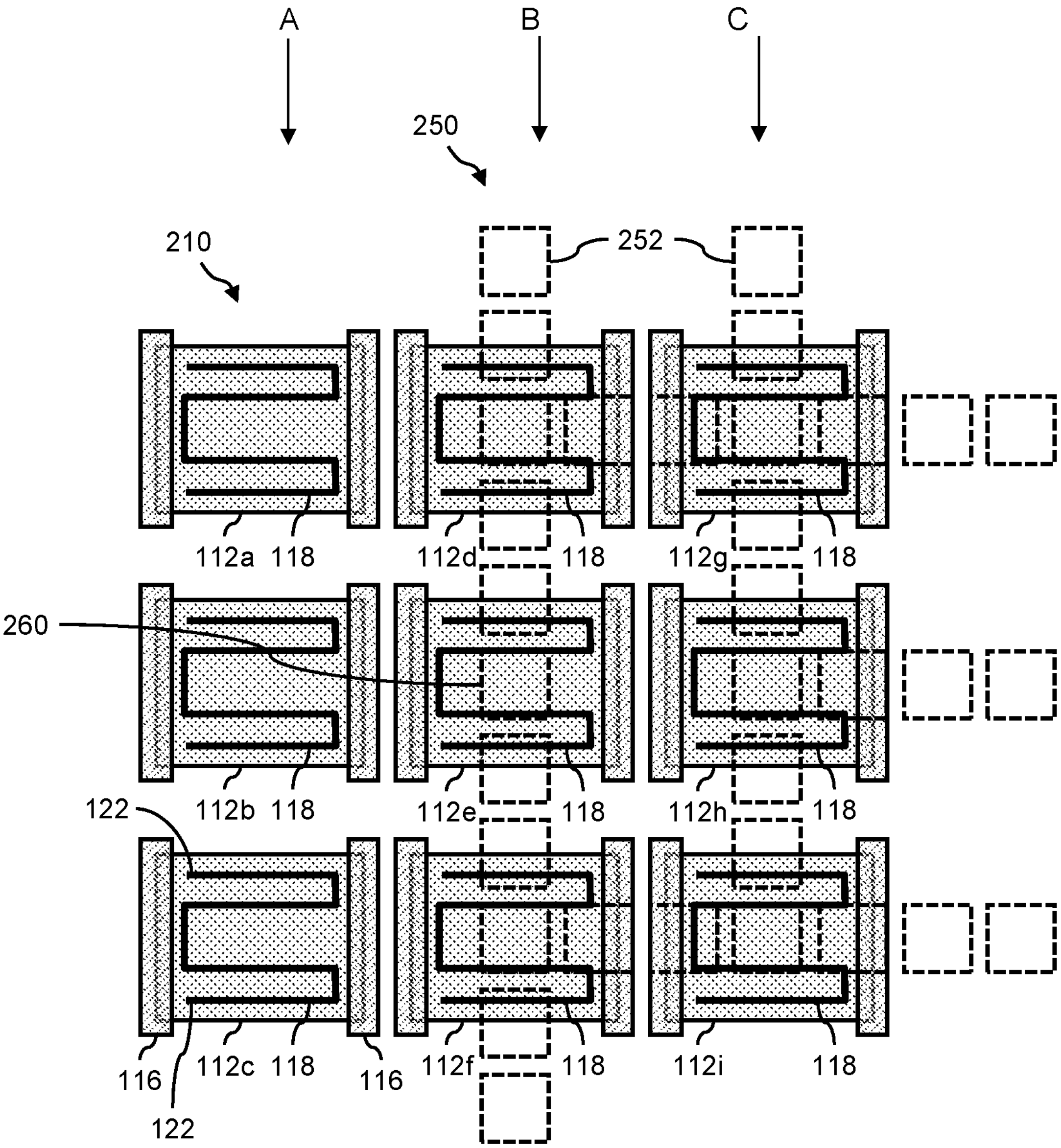
FIG. 4 is close-up plan view of an example integrated heater/sensor arrangement as shown in FIG. 3 in relation to a detection electrode.

FIG. 4A shows a close-up plan view of an example heater/sensor arrangement 210 including the 3×3 arrangement of PCB-integrated heaters 112 and PCB-integrated sensors 118 in relation to a detection electrode 260. For example, the 3×3 arrangement may include PCB-integrated heaters *112a*, *112b*, *112c*, *112d*, *112e*, *112f*, *112g*, *112h*, and *112i* and wherein the centermost PCB-integrated heater *112e* substantially aligns with the detection electrode 260. Furthermore, the 3×3 arrangement may include PCB-integrated sensors *118a*, *118b*, *118c*, 1128, *118e*, *118f*, *118g*, *118h*, and *118i* and wherein the centermost PCB-integrated sensor *118e* substantially aligns with the detection electrode 260.

In DMF system 100, each pairing of PCB-integrated heater 112 and PCB-integrated sensor 118 may represent a thermal zone. Accordingly, heaters and sensors located at or around a detection spot (e.g., detection electrode 260) allow for real-time fluorescent monitoring while the droplet undergoes rapid thermal PCR cycling. The integrated heater/sensor arrangement 210 including the 3×3 arrangement of PCB-integrated heaters 112 and PCB-integrated sensors 118 may be an example of providing micro-regional thermal control in a DMF cartridge, such as the DMF cartridge 110 shown in FIG. 1.

Figure 4B:
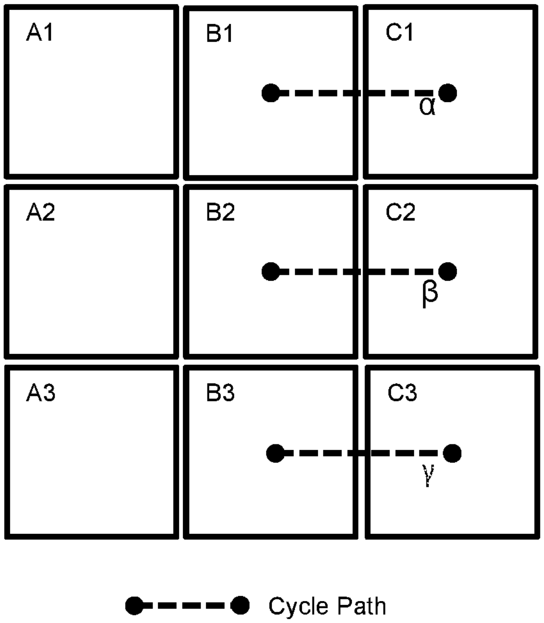

FIG. 4B shows an exemplary layout of a 3×3 heater arrangement. Heaters in columns B and C establish target temperatures in the gap that are associated with destination electrodes in a cycle path. Heaters in column A are boundary electrodes, which assist with maintaining the temperature of the temperature zones established by the heaters in Column B.

For example, heaters C1, C2 and C3 may be set at a denaturation temperature. Heaters B1, B2 and B3 may be set at an annealing temperature. And heaters A1, A2 and A3, functioning as border heaters, may set match the annealing temperature of heaters B1, B2 and B3. Droplets may be cycled along cycle paths α, β and γ to effect thermal cycling. Transport along cycle paths α, β and γ may effected by a path of electrodes (not shown) in the droplet operations gap between electrodes in the thermal zones established by the heaters.

In another example, heaters C1, C2 and C3 may be set at an annealing temperature. Heaters B1, B2 and B3 may be set at denaturation temperature. And heaters A1, A2 and A3, functioning as border heaters, may set match the denaturing temperature of heaters B1, B2 and B3. Droplets may be cycled along cycle paths α, β and γ to effect thermal cycling. End-to-end length of the cycling path may be exceedingly short, e.g., less than about 5,000 μm, or less than about 1,500 μm, or less than about 1,000 μm, or less than about 500 μm, or less than about 250 μm, or less than about 100 μm, or less than about 50 μm, or less than about 10 μm.

The layout shown in FIG. 4B may include a detection spot, e.g., in a central region of each of heaters B1, B2 and B3. In another embodiment a single detection spot may be situated in a central region of each of heaters B1, B2 or B3. The cycle path with the detection spot may be used for real-time PCR detection, while the cycle paths without the detection spot may be cycled without real-time detection, followed by transporting the droplet to the detection spot for an end-point detection. This permits cycling multiple reactions in parallel with less potential for contamination at the detector spot. In one example, the target is cycled on the real-time cycle path while a control is cycled on the end-point path.

While the cycle paths shown in FIG. 4B are linear, it will be appreciated that a variety of cycle paths are possible, including looped paths, or L-shaped paths. L shaped paths and looped are especially suitable for permitting multiple droplets to share a single detector during thermal cycling. Also, the relative size of the thermal zones can be larger, equal, or smaller compared to the droplet operations electrodes.

Figure 4C:
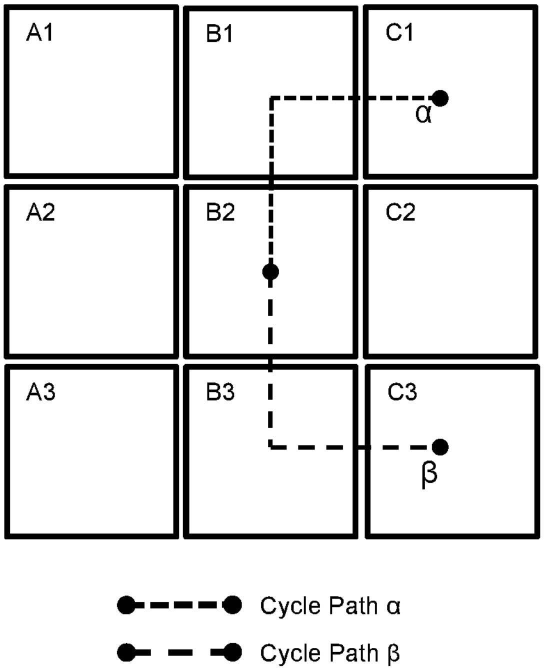

FIG. 4C shows the layout of a 3×3 heater arrangement in which cycle paths α and β share a detection spot (not shown) which is situated in a central region of heater B2. Heaters of the layout may, for example, have temperatures set as described above with respect to FIG. 4B. In this example, the cycle paths are L-shaped.

Figure 4D:
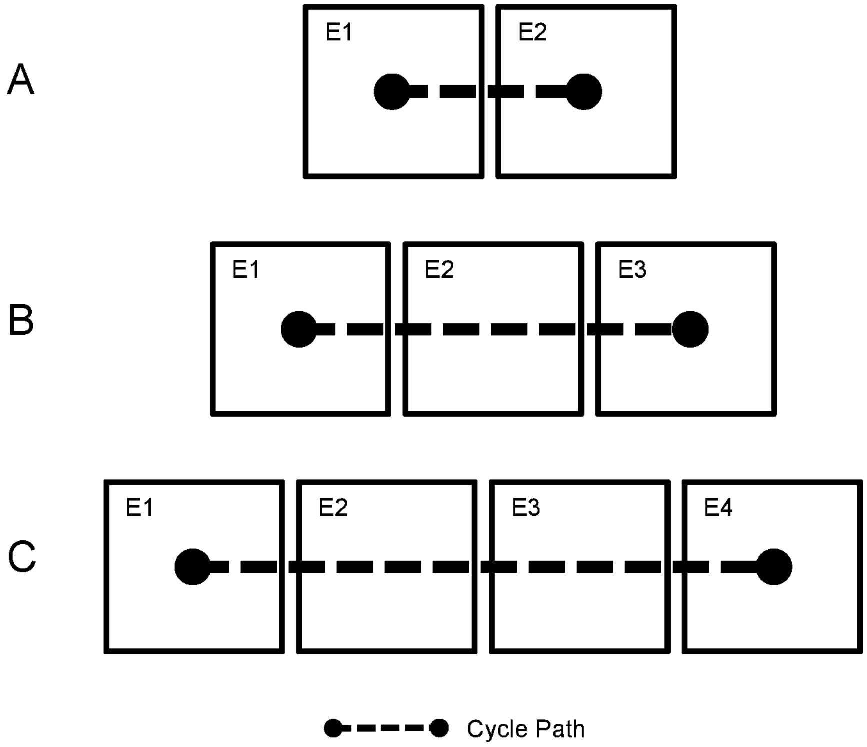

FIG. 4D illustrates several arrangements of electrodes along the cycle paths of FIG. 4B. The terminal points of the cycle paths are situated in the temperature zones established by heater arrangements.

Electrode arrangement A includes just 2 electrodes one at each of the terminal points of the cycle paths. Thus, a droplet on this path needs to be transported only to an adjacent electrode and back for thermal cycling purposes.

Electrode arrangement B includes just 3 electrodes, one at each of the terminal points of the cycle paths, and a single intervening electrode. Thus, a droplet on this path needs to be transported only along a three-electrode path for thermal cycling purposes. The central electrode, E2, is shown to be the same dimension as E1 and E3, however, E2 can be also be larger or smaller than E1 or E3. And E2 can also comprise multiple electrodes.

Although cycle paths are illustrated here as terminating at a single electrode, the termini of the cycle paths may be groups of electrodes. For example, a droplet may be delivered to a 2-electrode terminus where it is shuttled back and forth or elongated, in each case, using electrowetting-mediated droplet operations, while it is retained in the relevant thermal zone (e.g., retained at a denaturation temperature or an annealing temperature).

Electrode arrangement C includes just 4 electrodes, one at each of the terminal points of the cycle paths, and two intervening electrodes. Thus, a droplet on this path needs to be transported only along a four-electrode path for thermal cycling purposes.

In electrode arrangements A, B and C, the distances between the termini of the cycle paths may be exceedingly short. For example, the cycling path has a length from the electrode or electrodes at which the droplet is retained for denaturation to the electrode or electrodes at which the droplet is retained for annealing may have a distance of less than about 5,000 μm, or less than about 1,500 μm, or less than about 500 μm, or less than about 100 μm, or less than about 10 μm.

The thermal zones at either or both ends of the cycle paths may be supported by border heaters which do not underly the relevant cycle path terminus, but which do support maintenance of a constant temperature at the relevant cycle path terminus.

In one embodiment, a PCR cycle is accomplished in a period of less than about 6 seconds, or less than about 1 seconds, or less than about 0.5 seconds, or less than about 500 milliseconds, or less than about 100 milliseconds. In a system of the invention, the cycle time may be controlled by a controller.

Timing of the cycles includes transport time and time retained at the termini of the cycle paths. In one embodiment, the droplets being cycled are retained at the denaturation temperature for a time period of about 3 seconds or less, or about 1 seconds or less, or about 0.5 seconds or less, or about 500 milliseconds or less, or about 0 seconds. In one embodiment, the droplets being cycled are retained at the annealing temperature for a time period of about 3 seconds or less, or about 1 seconds or less, or about 0.5 seconds or less, or about 500 milliseconds or less, or about 0 seconds. Droplets may be held at extension temperature by holding at a certain electrode and/or transporting through the thermal gradients at a rate which ensures that the droplet achieves extension temperatures as the droplet traverses the thermal cycling path. In a system of the invention, the retention time may be controlled by a controller.

In one embodiment, the droplets being cycled are retained at an electrode or electrodes on the cycle path at the denaturation temperature for a time period of about 3 seconds or less, or about 1 seconds or less, or about 0.5 seconds or less, or about 500 milliseconds or less, or about 0 seconds. In one embodiment, the droplets being cycled are retained at an electrode or electrodes on the cycle path at the annealing temperature for a time period of about 3 seconds or less, or about 1 seconds or less, or about 0.5 seconds or less, or about 500 milliseconds or less, or about 0 seconds. In a system of the invention, the retention time may be controlled by a controller.

In one embodiment, transit time from a denaturation region of the cycle path to an annealing region of a cycle path is less than about 100 milliseconds, or less than about 50 milliseconds, or less than about 25 milliseconds, or less than about 10 milliseconds, or less than about 1 milliseconds, or less than about 0.1 milliseconds. Transit time may be measured from electrode to destination electrode in a first thermal zone, or may be measured from an electrode or group of electrodes to a destination electrode or group of electrodes in a destination thermal zone, e.g., annealing thermal zone to denaturation thermal zone, or denaturation thermal zone to annealing thermal zone.

Figure 5A:
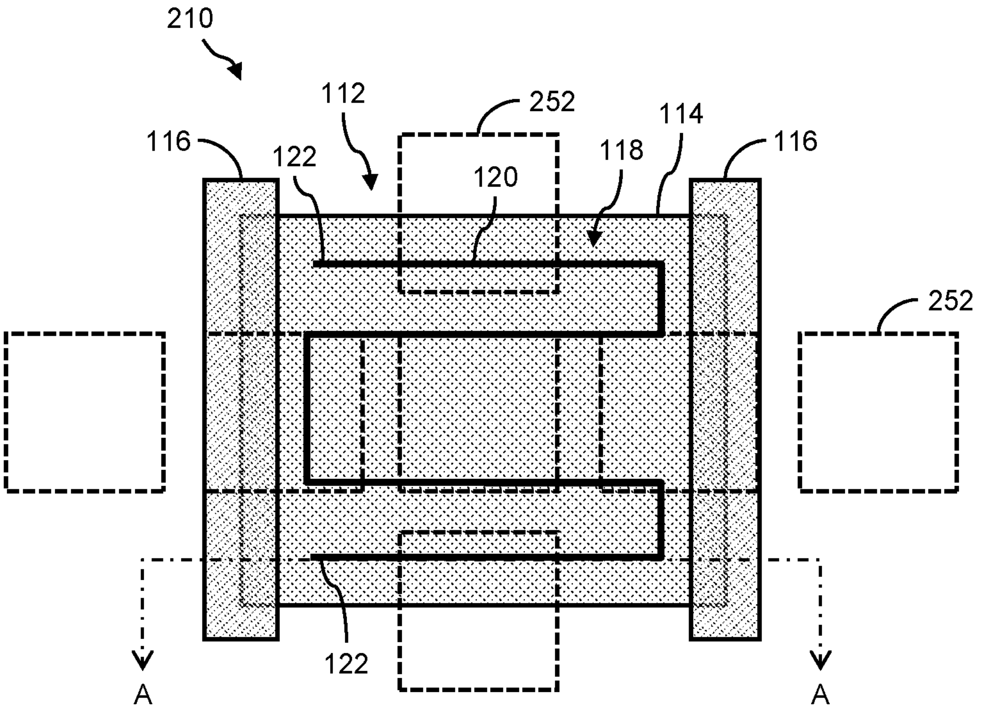
FIG. 5A and FIG. 5B are a plan view and a cross-sectional view, respectively, of an example of one integrated PCB-integrated heater and sensor.
Figure 5B:
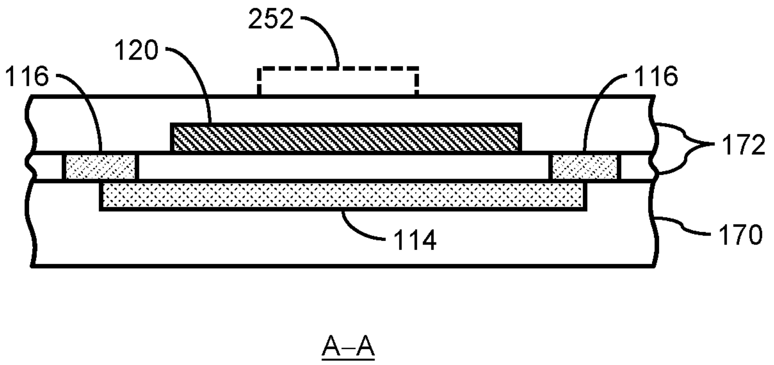

FIG. 5A and FIG. 5B show a plan view and a cross-sectional view, respectively, of an example of one integrated PCB-integrated heater 112 and PCB-integrated sensor 118 of the heater/sensor arrangement 210. FIG. 5B is a cross-sectional view taken along line A-A of FIG. 5A. In one example, PCB-integrated heater 112 includes heater element 114 arranged between two heater electrical contact pads 116. Heater element 114 may be formed of a resistive material, such as, but not limited to, ceramic materials such as graphite or carbon black, ceramic metals such as molybdenum disilicide, for example, metallic alloys such as nickel, molybdenum, and tungsten alloys, polymer-based materials such as Polymer Thick Film (PTF) heaters or epoxy-based heaters. Heater electrical contact pads 116 may be copper, gold, or silver pads. PCB-integrated sensor 118 may include a sensor trace 120. The sensor trace 120 may have, for example, a serpentine path that may be contacted electrically at each end (e.g., trace ends 122). In one example, PCB-integrated sensor 118 may be a copper-based sensor that includes a copper sensor trace 120.

In FIG. 5B, PCB-integrated heater 112 and PCB-integrated sensor 118 may be formed using a multilayer PCB. For example, the structure forming PCB-integrated heater 112 and PCB-integrated sensor 118 may include a PCB substrate 170, a carbon black heater element 114 formed atop the PCB substrate 170, heater electrical contact pads 116 formed atop the carbon black heater element 114, a copper sensor trace 120 formed atop the carbon black heater element 114, and droplet operations electrodes 252 formed atop the copper sensor trace 120. Further, where needed, electrical isolation between the carbon black heater element 114, the heater electrical contact pads 116, the copper sensor trace 120, and/or the droplet operations electrodes 252 may be provided by various dielectric and/or insulating layers 172.

Each pairing of PCB-integrated heater 112 and the corresponding portion of the PCB-integrated sensor 118 may represent a thermal zone. To heat with multiple thermal zones, yet with less power draw, the use of carbon black heater elements 114 may be beneficial over, for example, copper. For example, carbon black provides sheet resistances of at least two orders of magnitude larger than copper for the same area. For example, heating may require a 12V power rail and sheet resistances of approximately 150 ohms to supply 1 W of energy to each heater.

In some embodiments, the DMF system 100 makes use of standard 4-wire measurement methods. For example, DMF system 100 may utilize the linear relationship between resistance (R) and temperature (T) of copper traces over the required operating temperature range of interest (65° C. to 100° C.) in a DMF system 100.

Figure 6A:
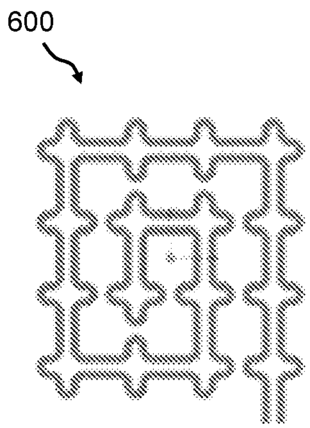
FIG. 6A shows an exemplary copper trace for a thermal resistance-temperature characterization applicable to the heater element of a PCB-integrated heater.
Figure 6B:
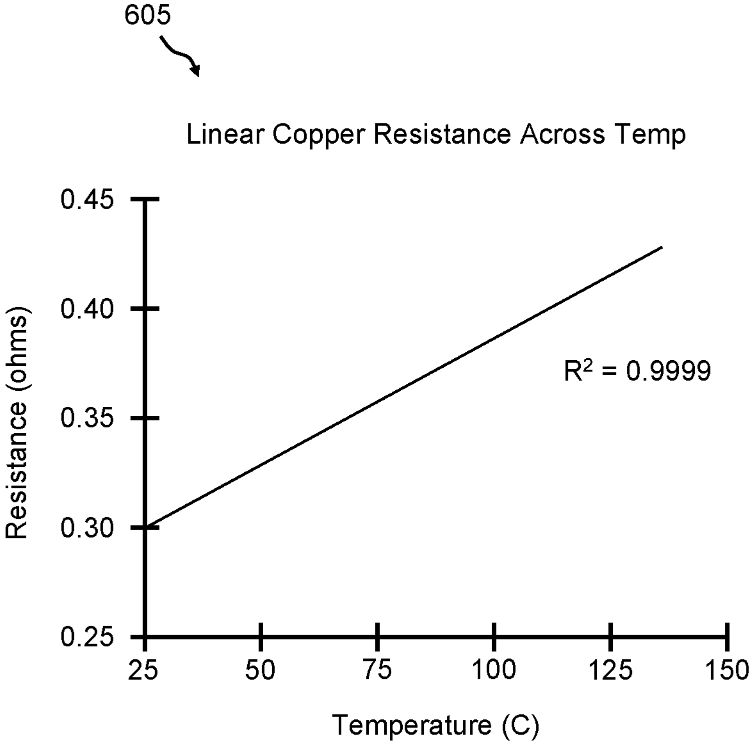
FIG. 6B shows a plot of the linear relationship between resistance and temperature of copper.

FIG. 6A and FIG. 6B show an example of the R-T relationship that may be present in a PCB-integrated heater 112 and a PCB-integrated sensor 118. FIG. 6A shows an exemplary copper trace 600 for thermal R-T characterization applicable to a carbon black heater element 114 of a PCB-integrated heater 112. FIG. 6B shows a plot 605 of the linear relationship between resistance and the temperature of copper, wherein the measured temperature coefficient of copper is within 1% of the accepted value.

Referring now to FIG. 7A, FIG. 7B, FIG. 7C, and FIG. 7D, these figures show data that supports the capabilities of the DMF system 100 with respect to heating uniformity and temperature cycling time.

Figure 7A:
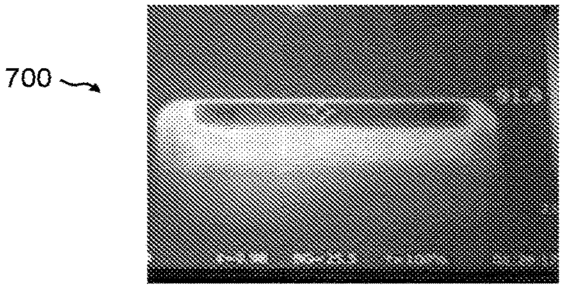
FIG. 7A, FIG. 7B, FIG. 7C, and FIG. 7D show data that supports the capabilities of the DMF system with respect to heating uniformity and temperature cycling time.

FIG. 7A shows a thermal image 700 of seven (7) zones for heating a DMF cartridge (e.g., DMF cartridge 110) to 92° C. with closed-loop sensing control.

Figure 7B:
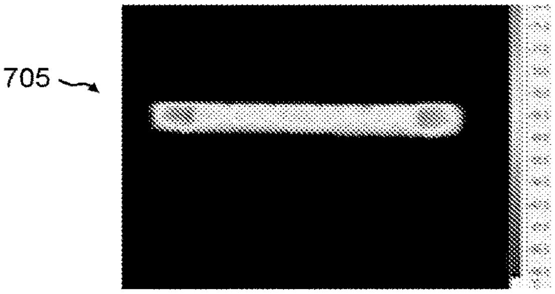
Figure 7C:
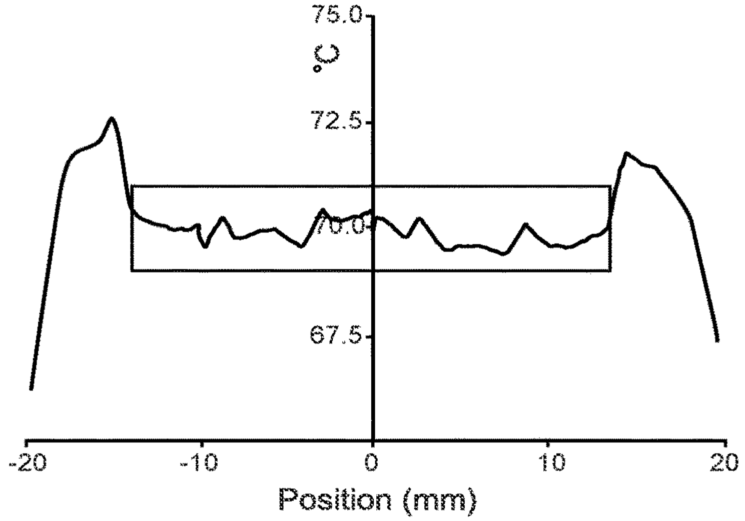

FIG. 7B and FIG. 7C show a thermal image 705 and a plot 710, respectively, indicating that temperature uniformity (<0.5° C.) in the center region meets specifications of 7.77° C./sec heating from RT to 100° C. In this case, the droplet may be held stationary on a thermal zone while the heaters are heated and cooled at exceedingly fast rates to achieve fast thermal cycling conditions.

Figure 7D:
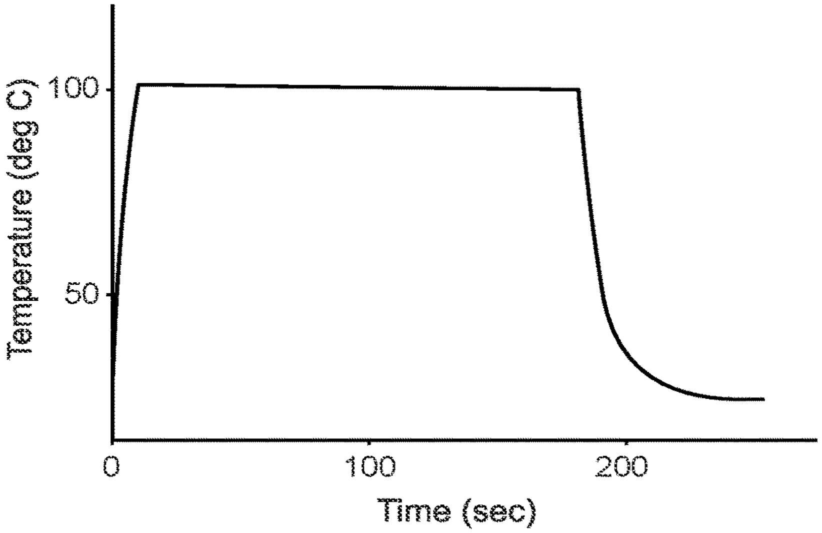

FIG. 7D shows a plot 715 indicating that uniformity (<0.5° C.) in the center region meets specifications of 3.9° C./sec cooling from 100° C. to 37° C. The cooling rate can be further increased by placement of either a fan for convective cooling or Peltier for conductive cooling or another active cooling device.

Transitioning over a complete PCR cycle may be under about 20 seconds per full cycle. Transitioning over a complete PCR cycle may be under about 15 seconds per full cycle. Transitioning over a complete PCR cycle may be under about 10 seconds per full cycle. Transitioning over a complete PCR cycle may be under about 9 seconds per full cycle. Transitioning over a complete PCR cycle may be under about 8 seconds per full cycle. Transitioning over a complete PCR cycle may be under about 5 seconds per full cycle. Transitioning over a complete PCR cycle may be under about 2 seconds per full cycle.

Transitioning over a complete PCR cycle ($\Delta T$=30° C.) may be under about 20 seconds per full cycle. Transitioning over a complete PCR cycle ($\Delta T$=30° C.) may be under about 15 seconds per full cycle. Transitioning over a complete PCR cycle ($\Delta T$=30° C.) may be under about 10 seconds per full cycle. Transitioning over a complete PCR cycle ($\Delta T$=30° C.) may be under about 9 seconds per full cycle. Transitioning over a complete PCR cycle ($\Delta T$=30° C.) may be under about 8 seconds per full cycle.

In some embodiments, the DMF system 100 provides a multiple copper sensor design with, for example, 4, 5, 6, 7, 8, 9, 10, 11, 12, 13, 14, 15, 16, 17, 18, 19, 20 or more PCB-integrated sensors 118, each spatially unique for the purpose of measuring heaters, preferably a corresponding number of PCB-integrated heaters 112. One example is the heater/sensor arrangement 210 which includes the 3×3 arrangement of nine PCB-integrated heaters 112 and PCB-integrated sensors 118, as shown in FIG. 2, FIG. 3, and FIG. 4.

In some embodiments, the DMF system 100 provides a closed, controlled loop system of sensing and heating on a DMF cartridge (e.g., DMF cartridge 110). In DMF system 100, integrating sensing on-cartridge provides real-time feedback of temperatures with high accuracy, while heating provides rapid delivery for quick thermal cycling.

In each pairing of PCB-integrated heater 112 and PCB-integrated sensor 118, copper sensor trace 120 may be electrically connected to, for example, thermal control electronics 156 of DMF instrument 105. Thermal control electronics 156 may include a constant current or voltage source that supplies each copper sensor trace 120. Thermal control electronics 156 may include data acquisition capability with respect to using PCB-integrated sensor 118 to measure and log the temperature at each PCB-integrated heater 112 using the inherent linear relationship of the resistance of copper in the sensor to the temperature of the sensor.

Figure 8A:
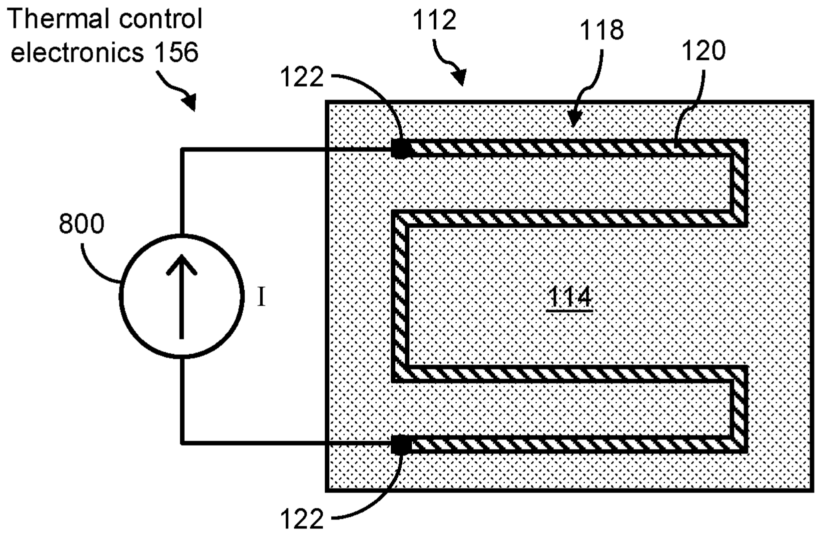
FIG. 8A and FIG. 8B are schematic diagrams of an example of a constant current source driving a pairing of the PCB-integrated heater and PCB-integrated sensor.
Figure 8B:
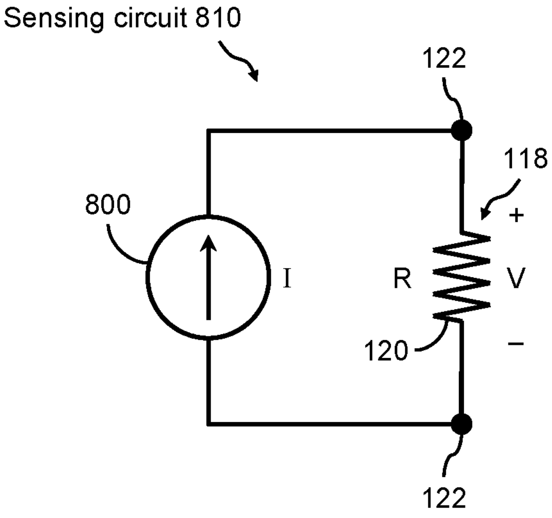

Because the resistance or conductivity of, for example, copper changes with temperature, thermal control electronics 156 may be used in one example to provide a constant current to a copper sensor trace 120 and then monitor the voltage across its trace ends 122. Thermal control electronics 156 may be used to correlate the voltage value to a resistance value, and then correlate the resistance value to a temperature, wherein PCB-integrated heater 112 is the source of heat. FIG. 8A and FIG. 8B are schematic diagrams of an example of a constant current source of thermal control electronics 156 driving the pairing of a PCB-integrated heater 112 and a PCB-integrated sensor 118. FIG. 8A shows, for example, a constant current source 800 electrically connected across trace ends 122 of the copper sensor trace 120 to provide a constant current flow through the copper sensor trace 120. FIG. 8B shows a sensing circuit 810 that includes constant current source 800 with respect to a resistor R. Resistor R represents the resistance of the copper sensor trace 120. Using thermal control electronics 156, with the current I held constant and whereas the value of resistor R changes with temperature, the voltage V may be monitored. If the current through resistor R (the copper sensor trace 120) is held constant and the temperature of the resistor (the copper sensor trace 120) falls, the resistance R decreases, causing the voltage V to decrease. Conversely, when the temperature of the copper sensor trace 120 rises, the resistance R of the copper sensor trace 120 increases, which causes the voltage V to increase.

Figure 9A:
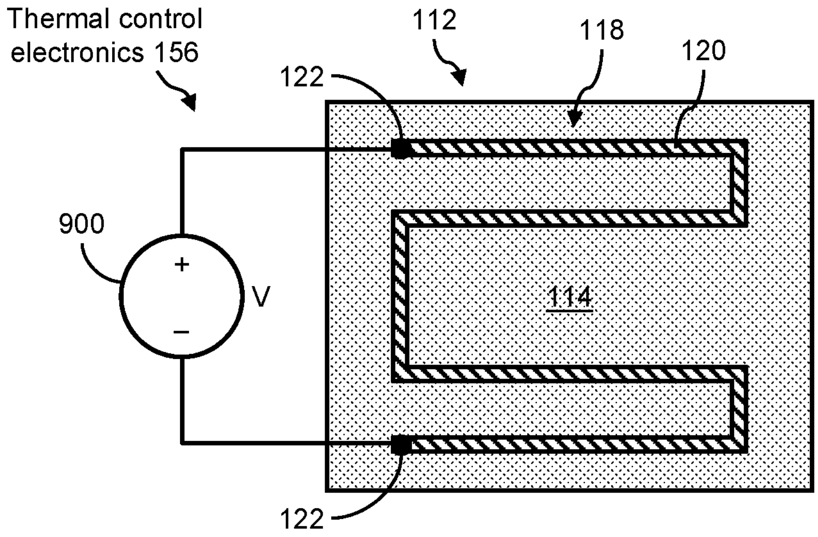
FIG. 9A and FIG. 9B are schematic diagrams of an example of a constant voltage source driving a pairing of the PCB-integrated heater and PCB-integrated sensor.
Figure 9B:
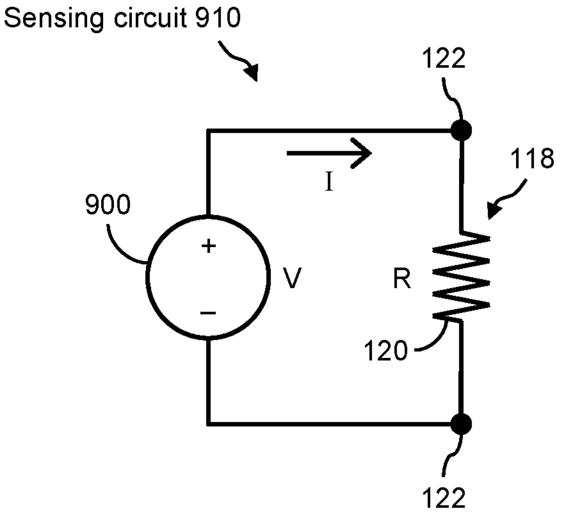

Because the resistance or conductivity of, e.g., copper changes with temperature, thermal control electronics 156 may be used in another example to provide a constant voltage across the trace ends 122 of the copper sensor trace 120, to then monitor the current flowing in the copper sensor trace 120, to then correlate the current value to a resistance value, and then to correlate the resistance value to a temperature, wherein PCB-integrated heater 112 is the source of heat. FIG. 9A and FIG. 9B are schematic diagrams of an example of a constant voltage source of thermal control electronics 156 driving the pairing of PCB-integrated heater 112 and PCB-integrated sensor 118. FIG. 9A shows, for example, a constant voltage source 900 electrically connected across trace ends 122 of copper sensor trace 120 to provide a constant voltage across the trace ends 122 of copper sensor trace 120. FIG. 9B shows a sensing circuit 910 which has a constant voltage source 900 with respect to a resistor R. Resistor R represents the resistance of the copper sensor trace 120. Using thermal control electronics 156, with the voltage V held constant and whereas the value of resistor R changes with temperature, the current I flowing through resistor R may be monitored. If the voltage V through resistor R (the copper sensor trace 120) is held constant and the temperature of the resistor (the copper sensor trace 120) falls, the resistance R decreases, causing the current I to increase. Conversely, when the temperature of the copper sensor trace 120 rises, the resistance R of the copper sensor trace 120 increases, which causes the current I to decrease.

Digital Microfluidics System

Figure 10:
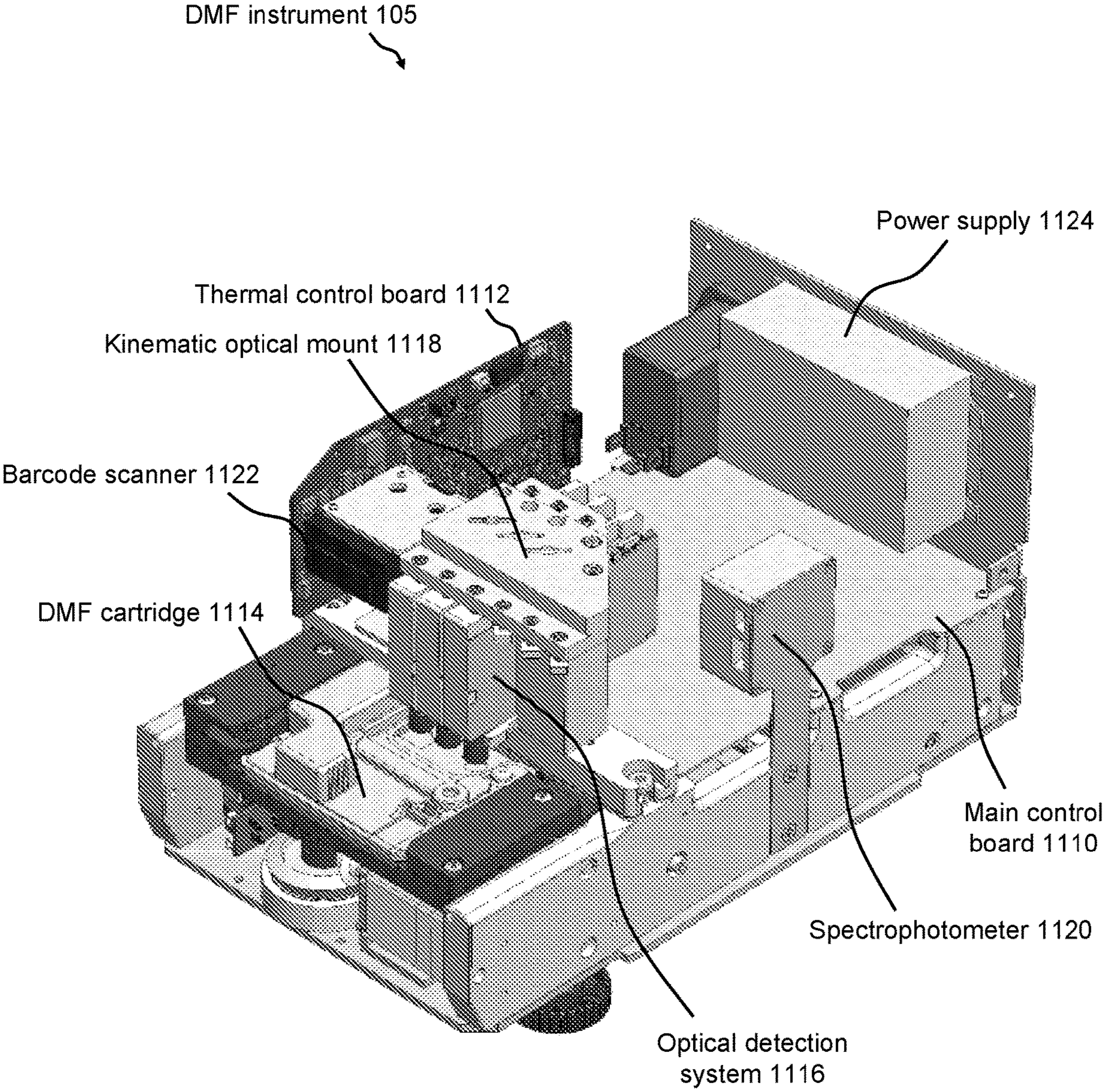
FIG. 10 is a perspective view of an example DMF instrument including a thermal control board.

FIG. 10 is a perspective view of an example of DMF instrument 105 that may include a thermal control board for controlling, for example, any heater/sensor arrangement 210 of the DMF system 100. In this example, DMF instrument 105 may include a main control board 1010, a thermal control board 1012 for controlling, for example, any heater/sensor arrangement 210, a DMF cartridge 1014 (e.g., an example of DMF cartridge 110 shown in FIG. 1), an optical detection system 1016, a kinematic optical mount 1018, a spectrophotometer 1020, a barcode scanner 1022, and a power supply 1024 all housed in an instrument body 1030. In this example, main control board 1010 may be an example of controller 150 of FIG. 1, thermal control board 1012 may be an example of thermal control electronics 156 of FIG. 1, DMF cartridge 1014 may be an example of the DMF cartridge 110 shown in FIG. 1, optical detection system 1016 may be an example of a thermal imaging camera 154 of FIG. 1 or absorbance, reflectance, fluorescence, or luminescence measurement system, and power supply 1024 may be an example of power sources 158 of FIG. 1.

Nucleic Acid Extraction and Amplification Protocol

Figure 11:
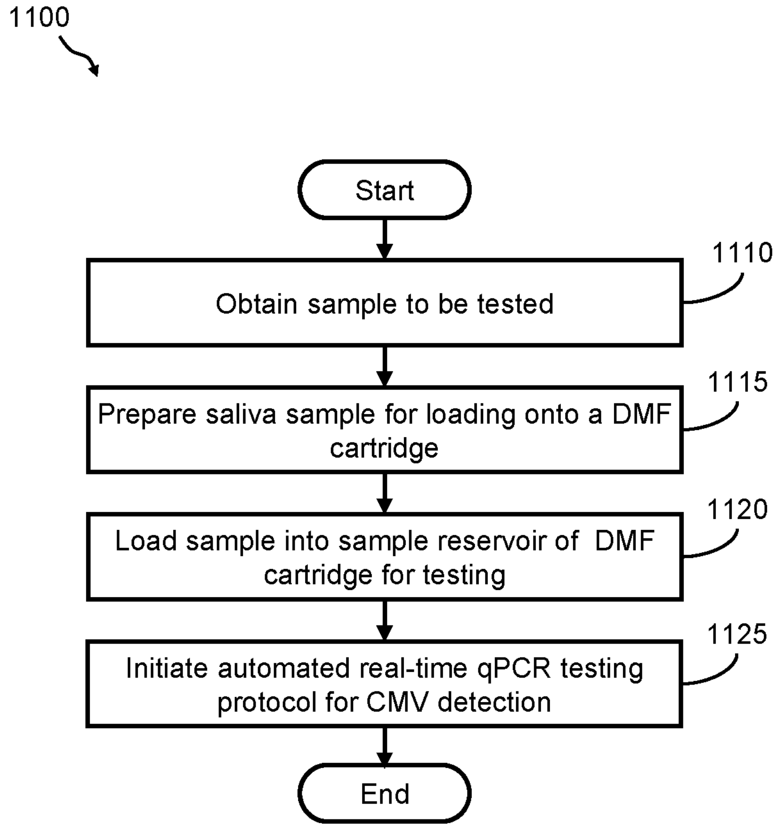
FIG. 11 is a flow diagram of an example of a workflow for testing a patient saliva sample for a viral infection using the DMF system and DMF cartridge.

The DMF system 100 that includes DMF cartridge 110 with the integrated PCB-integrated heaters and PCB-integrated sensors may be programmed to execute a nucleic acid extraction and amplification protocol for the detection of a pathogen. In some embodiments, the nucleic acid extraction and amplification protocol for detection of a pathogen is designed to work with dried reagents and a direct swab input and further reduce time to results. In some embodiments, the nucleic acid extraction and amplification protocol for detection of a pathogen is a "hybrid" protocol wherein nucleic acids are first captured on magnetically responsive beads using an "on-bench" protocol and loaded onto a DMF cartridge for further processing. For example, FIG. 11 is a flow diagram of an example workflow 1100 for testing a patient saliva sample for a viral infection using the DMF system 100 and DMF cartridge 110.

Figure 12:
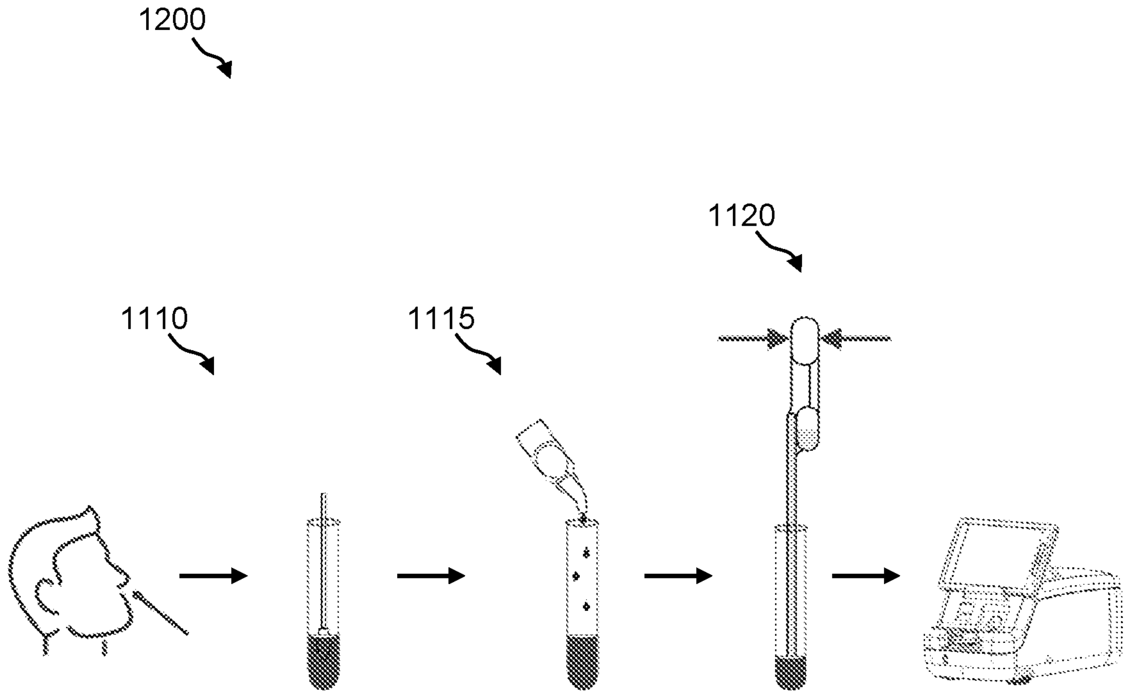
FIG. 12 shows pictorially an example of certain steps of the workflow shown in FIG. 11.

FIG. 12 illustrates steps of the example workflow 1100 as applied to an oral or nasal or nasopharyngeal or oropharyngeal specimen such as saliva or nasal swab. In this example, while there are many possible variations, workflow 1100 may include but is not limited to, the following steps as well as additional unspecified steps.

At a step 1110, a sample to be tested is obtained, e.g., a saliva sample. In one example, the sample is a saliva sample collected from a newborn for testing for congenital cytomegalovirus (cCMV). The saliva sample may, for example, be collected using a swab that is then placed in a test tube that contains a buffer solution. For example, the buffer solution may be prepared using the Centers for Disease Control (CDC) protocol for the "Preparation of Viral Transport Medium" (SOP #: DSR-052-05), which may include 2% Fetal Bovine Serum (FBS), 100 µg/mL Gentamicin sulfate, 0.5 µg/mL Amphotericin B and 70% ethanol, for example. After a period of time sufficient to disperse the saliva sample into the buffer solution, such as one (1) minute or less to approximately forty-eight (48) hours, the swab is removed from the test tube. This step is also shown pictorially in FIG. 12.

At a step 1115, the sample is prepared for loading into a DMF cartridge. For example, a binding buffer solution that includes magnetically responsive nucleic acid capture beads may be added to the sample, e.g., the saliva sample. In one example, the nucleic acid capture beads are Dynabeads® MyOne™ SILANE beads Thermo Fisher Scientific, Waltham, MA). This step is also shown pictorially in FIG. 12.

At a step 1120, the sample, e.g., saliva sample, is loaded into a sample reservoir of a DMF cartridge for testing. For example, the sample with magnetically responsive capture beads therein is loaded into the sample reservoir of a DMF cartridge 110 that is configured for qPCR detection of CMV DNA in a sample. In one example, the saliva sample is transferred into a sample reservoir of DMF cartridge 110 that has been pre-loaded onto the deck of a FINDER© instrument (available from Baebies, Inc., Durham, NC). In one example, the saliva sample is transferred into the sample reservoir of DMF cartridge 110 using a pipet. This step is also shown pictorially in FIG. 12.

At a step 1125, the automated qPCR testing protocol for CMV DNA is initiated. For example, the automated steps of a sample preparation protocol (e.g., bead washing and elution of bound DNA from the capture beads), initiating a qPCR reaction (e.g., combining the DNA containing droplet with a qPCR master mix reagent droplet), and qPCR amplification and detection protocols are performed. In one example, a "static" or "in-place" qPCR protocol may be used for amplification and detection of CMV DNA. In the "static" or "in-place" PCR protocol the droplet is parked and the temperature is cycled. An example of a static or in-place PCR protocol is described herein below with reference to FIG. 13. In another example, a "shuttling" PCR protocol may be used for amplification and detection of CMV DNA. In shuttling PCR protocols, the droplet is shuttled between heating zones. An advantage of a shuttling PCR protocol is that the protocol does not have to wait for heaters to heat up or cool down. An example of a shuttling PCR protocol is described hereinbelow with reference to FIG. 14A and FIG. 14B.

In another example of workflow 1100, the collection swab with the saliva sample thereon is used to directly input the saliva sample into a sample reservoir of DMF cartridge 110.

In Place Thermal Cycling

Figure 13:
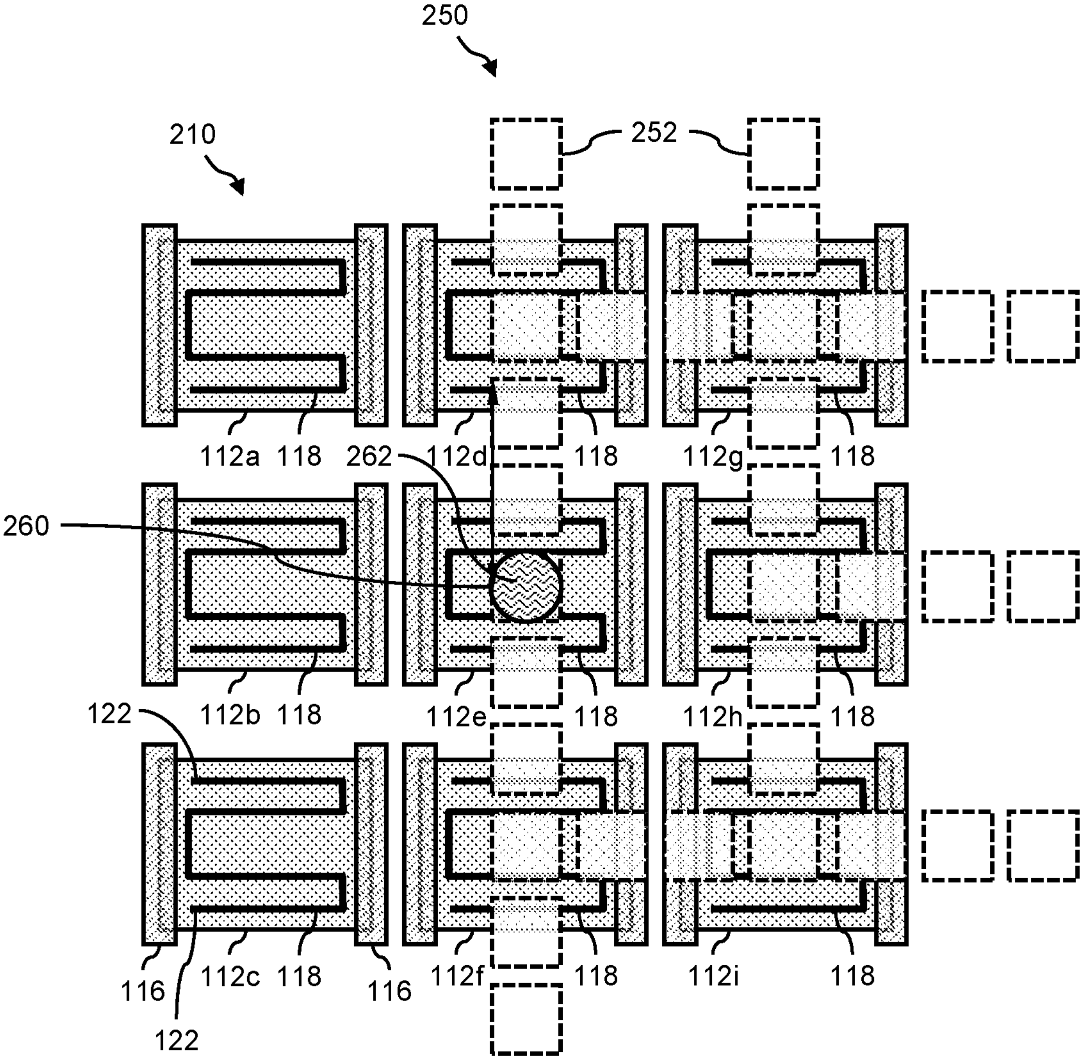
FIG. 13 is a closeup plan view of an example of the integrated heater/sensor portion of the DMF cartridge being used in a static or in-place PCR protocol.

FIG. 13 is a close-up plan view of an example of the integrated heater/sensor portion of DMF cartridge 110 being used in a static or in-place PCR protocol. For example, the integrated heater/sensor arrangement 210 of DMF cartridge 110 may be used in the in-place PCR protocol. In this example, the in-place PCR protocol is being performed on a droplet 262 sitting static atop detection electrode (or spot) 260 of electrode configuration 250. In the DMF system 100 and DMF cartridge 110, the presence of on-cartridge heating/sensing allows rapid in-place PCR thermal cycling. For example, the 3×3 arrangement of PCB-integrated heaters 112 and PCB-integrated sensors 118 located at or around detection electrode (or spot) 260 allows for real-time fluorescent monitoring while droplet 262 undergoes rapid in-place PCR thermal cycling, for example, between about 95° C. and about 60° C. or between about 85° C. and about 70° C.

Any combination of PCB-integrated heaters 112*a* through 112*i* may be used to cause circulation or recirculation in the static droplet 262 sitting atop the detection electrode (or spot) 260. In one example, all PCB-integrated heaters 112*a* through 112*i* may be cycled during the in-place PCR protocol. In another example, only PCB-integrated heater 112*e* at detection electrode (or spot) 260 may be cycled during the in-place PCR protocol. In yet another example, droplet 262 may sit static atop detection electrode (or spot) 260 and two PCB-integrated heaters 112 alongside detection electrode (or spot) 260 (e.g., PCB-integrated heaters 112*b*, 112*h* but not PCB-integrated heater 112*e*) may be cycled during the in-place PCR protocol. In still another example, droplet 262 may sit static atop detection electrode (or spot) 260 and four PCB-integrated heaters 112 alongside detection electrode (or spot) 260 (e.g., PCB-integrated heaters 112*d*, 112*b*, 112*f*, 112*h* but not PCB-integrated heater 112*e*) may be cycled during the in-place PCR protocol. In yet another example, the droplet may be cycled up to denaturation temperature and then down to annealing temperature and later shuttled to another thermal zone for extension.

Shuttling Thermal Cycling

Figure 14A:
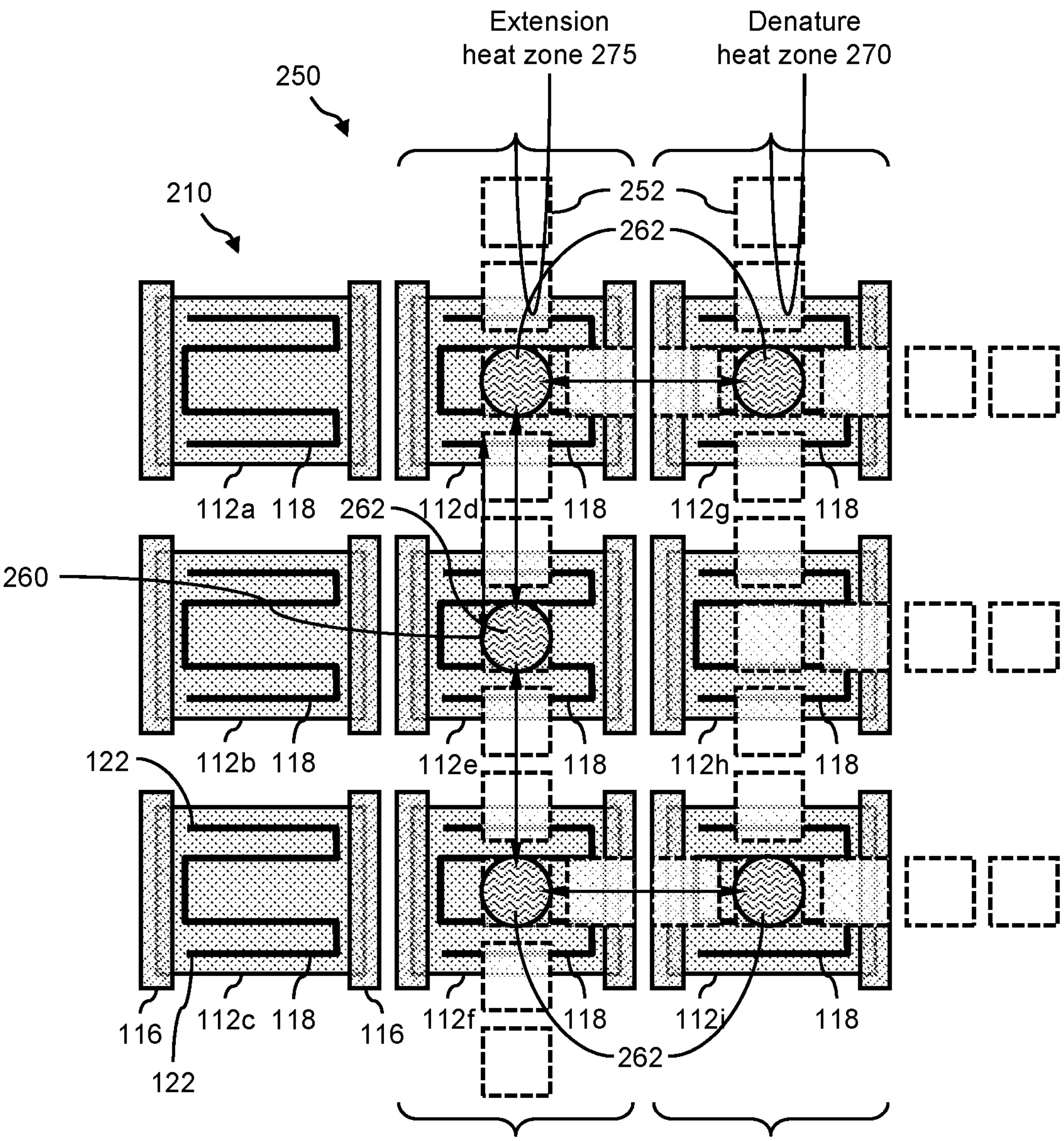
FIG. 14A and FIG. 14B are closeup plan views of two example configurations of the integrated heater/sensor portion of the DMF cartridge being used in a shuttling PCR protocol.

FIG. 14A is a close-up plan view of an example of the integrated heater/sensor portion of the DMF cartridge 110 being used in a shuttling PCR protocol. For example, the integrated heater/sensor arrangement 210 of DMF cartridge 110 may be used in the shuttling PCR protocol. In this example, the shuttling PCR protocol is being performed on droplet 262 that is being shuttled (using droplet operations) between a denature heat zone 270 and an extension heat zone 275 (i.e., annealing and extension) of an electrode configuration 250. In DMF system 100 and DMF cartridge 110, the presence of on-cartridge heating/sensing allows rapid shuttling of reaction droplets for PCR thermal cycling. For example, one portion of the 3×3 arrangement of PCB-integrated heaters 112 and PCB-integrated sensors 118 supports a denature heat zone 270. The temperature at a denature heat zone 270 may be, for example, about 95° C. Another portion of the 3×3 arrangement of PCB-integrated heaters 112 and PCB-integrated sensors 118 supports extension heat zone 275. The temperature at an extension heat zone 275 may be, for example, about 60° C. By shuttling droplet 262 between denature heat zone 270 and an extension heat zone 275, the droplet 262 undergoes rapid shuttling PCR thermal cycling between about 95° C. and about 60° C. Primer annealing for the next cycle of PCR amplification occurs during the transition (shuttling) between denaturing and extension and does not require a dedicated temperature. In another example, denature heat zone 270 may be set at about 85° C. and extension heat zone 275 may be set at about 70° C.

Accordingly, in the example shown in FIG. 14A, the three PCB-integrated heaters 112*g*, 112*h*, and 112*i* in denature heat zone 270 may be set, for example, at about 95° C. The three PCB-integrated heaters 112*d*, 112*e*, and 112*f* in extension heat zone 275 may be set, for example, at about 60° C. The remaining three PCB-integrated heaters 112*a*, 112*b*, and 112*c* outside of extension heat zone 275 may be set, for example, at about 60° C. or turned off. With respect to PCB-integrated heaters 112, one path of rapid shuttling of droplet 262 may be, for example, from PCB-integrated heater 112*g* (95° C.), to 112*d* (60° C.), to 112*e* (60° C., detection electrode (or spot) 260), to 112*f* (60° C.), to 112*i* (95° C.), and returning back to 112*g* by the reverse route. Another path of rapid shuttling of droplet 262 may be, for example, from PCB-integrated heater 112*g* (95° C.), to 112*d* (60° C.), to 112*e* (60° C.) (detection electrode (or spot) 260), and back to 112*d* (60° C.), and then to 112*g* (95° C.). Another path of rapid shuttling of droplet 262 may be, for example, a complete loop from PCB-integrated heater 112*g* (95° C.), to 112*d* (60° C.), to 112*e* (60° C., detection electrode (or spot) 260), to 112*f* (60° C.), to 112*i* (95° C.), to 112*h* (95° C.), and back to 112*g* (95° C.). In this example, detection may be performed each time droplet 262 passes by detection electrode (or spot) 260.

Figure 14B:
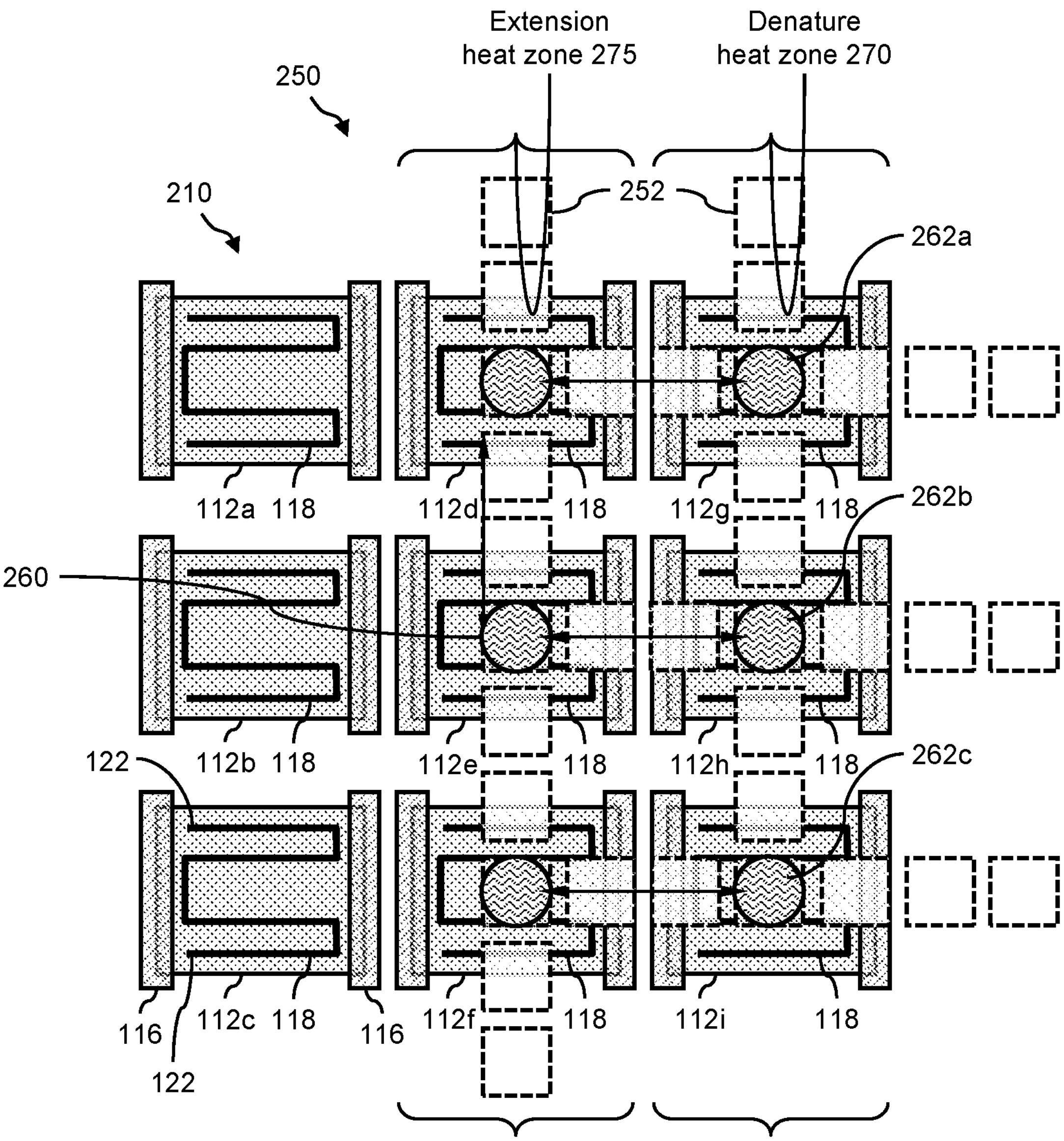

FIG. 14B is a close-up plan view of another configuration of the integrated heater/sensor arrangement 210 of DMF cartridge 110 for performing a shuttling PCR protocol. In this example, the configuration of the integrated heater/sensor arrangement 210 is substantially the same as the configuration shown in FIG. 15A except for additional droplet operations electrodes 252 arranged between PCB-integrated heaters 112*e* and 112*h*. In this example, a shuttling PCR protocol may be performed on multiple droplets 262 (e.g., droplets 262*a*, 262*b*, 262*c*) simultaneously. For example, with respect to PCB-integrated heaters 112, droplet 262*a* may be rapidly shuttled back and forth between PCB-integrated heaters 112*g* (95° C.) and 112*d* (60° C.). At the same time, droplet 262*b* may be rapidly shuttled back and forth between PCB-integrated heaters 112*h* (95° C.) and 112*e* (60° C.). At the same time, droplet 262*c* may be rapidly shuttled back and forth between PCB-integrated heaters 112*i* (95° C.) and 112*f* (60° C.).

Further, FIG. 14B shows an example of a short distance shuttling PCR protocol, meaning that droplet 262 travels a short span of about four droplet operations electrodes 252 only during the shuttling PCR protocol. If, for example, each droplet operations electrode 252 is about 1 $mm^2$, then the travel distance for droplet 262 may be about 3 mm only. However, other dimensions and numbers of electrodes are possible for supporting a short-distance shuttling PCR protocol. For example, using certain sized droplet operations electrodes 252 and certain sized PCB-integrated heaters 112, shuttling may occur between two adjacent electrodes. Further, the higher the temperature differential between the two adjacent heating zones the shorter the distance may be. In this example, because there may be single-channel detection using the one detection electrode (or spot) 260 only, real-time detection may be performed on droplet 262*b* only. By contrast, end-point detection may be performed on droplets 262*a* and 262*c* after completing the cycles of the shuttling PCR protocol. Further, in this example, droplet 262*b* that receives the real-time detection may be the target of the shuttling PCR protocol while droplets 262*a* and 262*c* that do not receive the real-time detection may be control droplets. However, in another example using single-channel detection, real-time detection may be performed on all three droplets 262*a*, 262*b*, and 262*c* by transporting all three droplets (262*a*, 262*b*, and 262*c*) in a loop through denature heat zone 270 and extension heat zone 275 and passing over detection electrode (or spot) 260 with each pass around the loop.

Furthermore, and referring now to FIG. 1 through FIG. 14B, integrated heater/sensor arrangement 210 is not limited to one or up to nine pairs of PCB-integrated heaters 112 and PCB-integrated sensors 118. Heater/sensor arrangement 210 may include any number and any arrangements of PCB-integrated heaters 112 and PCB-integrated sensors 118. Further, electrode configuration 250 of PCB substrate 200 of DMF cartridge 110 is not limited to one integrated heater/sensor arrangement 210. Electrode configuration 250 may include any number and any arrangements of integrated heater/sensor arrangements 210. Further, DMF system 100 is not limited to single-channel detection only. Rather, DMF system 100 may include multi-channel detection for performing multiple in-place or shuttling PCR protocols simultaneously (i.e., multiplex PCR) using multiple multi-channel fluorimeters for multiple droplets or imaging using a camera for optical simultaneous detection of multiple droplets. Further, the rapid shuttling PCR protocol is not limited to two-temperature cycling (e.g., between 95° C. and 60° C. or between 85° C. and 70° C.). Rather, multi-temperature cycling may be possible, such as three-temperature or four-temperature cycling. The thermal zones are also utilized to perform reverse transcription of RNA into DNA at a temperature within 120 seconds, or 60 seconds, or even within 10 seconds. In another example, all of the PCB-integrated heaters 112 may be set to the same temperature for any other droplet protocols such as maintaining 37° C. for many biochemical reactions. In another example, the integrated heater/sensor arrangement 210 may be used in combination with other on- or off-cartridge heating mechanisms.

Shuttling PCR for CMV

To demonstrate the detection of CMV in saliva samples, a DMF cartridge with integrated heaters and sensors, and a "shuttling" qPCR protocol configured for amplification of CMV DNA were used. Archived, frozen newborn saliva samples in transport media were obtained from, for example, the University of Alabama and Duke University. The saliva samples included 6 CMV-positive samples and 2 CMV-negative samples. CMV primer and probe sequences for qPCR amplification of CMV DNA and custom sequences for internal control (RPP 30) were purchased from, for example, Integrated DNA Technologies (IDT, Coralville, IA). All protocol steps for detecting CMV DNA in the saliva samples were performed on the automated DMF cartridge. Briefly, 62.5 μL of saliva samples were loaded into sample reservoirs of the DMF cartridge and combined with 62.5 μL lysis reagent, for example, the ChargeSwitch™ Total RNA Cell Kit may be used (ThermoFisher Scientific, Waltham, MA). Nucleic acids in the lysed sample were then concentrated by binding to 0.75 μL (25 mg/mL) magnetically responsive beads. A standard bead washing DMF protocol was used to remove sample impurities that may interfere with the subsequent qPCR assay. Thermal cycling for qPCR amplification was performed by shuttling reaction droplets between temperature zones on the DMF cartridge. The distance between the denaturation and annealing electrodes was 4.5 mm. Amplification products were detected as fluorescent output.

Figure 15:
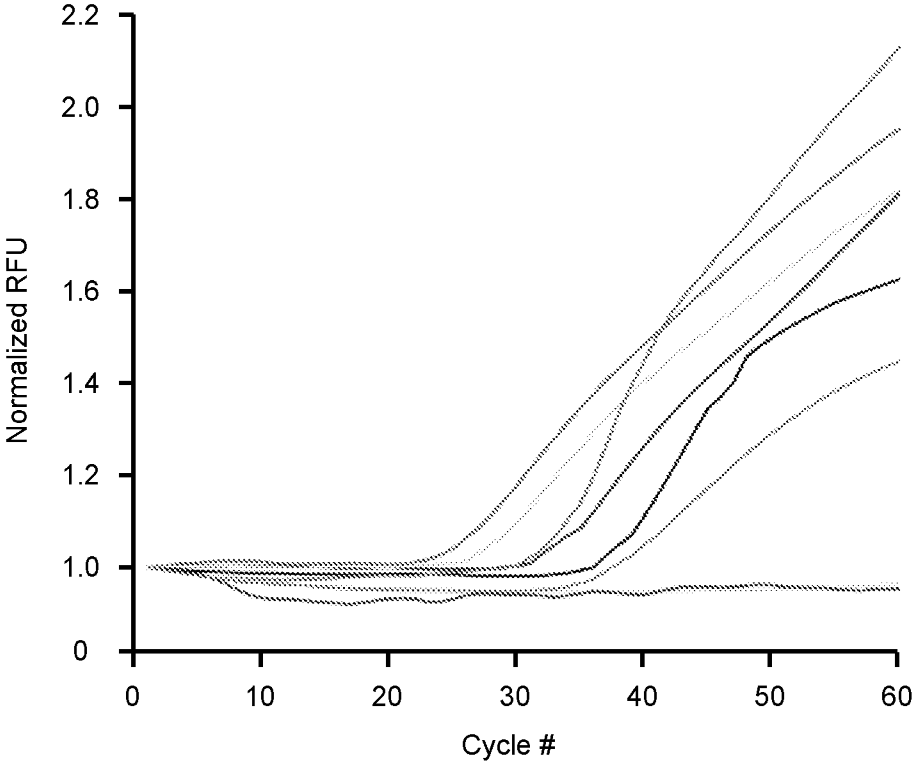
FIG. 15 shows a plot of normalized RFU versus the number of PCR cycles for eight newborn saliva samples tested for CMV DNA and using a shuttling PCR protocol.

FIG. 15 is an example of a plot 1500 of normalized relative fluorescence unit (RFU) versus the number of PCR cycles for eight (8) newborn saliva samples tested for CMV DNA using a shuttling PCR protocol. PCR amplification was detected for the six (6) CMV-positive newborn saliva samples using shuttling PCR protocol, while the two (2) CMV-negative samples show flat curves. PCR for all samples was completed within eight (8) minutes (i.e., 40 cycles). Some CMV positive samples are detected in less than four (4) minutes, whereas each cycle in this example takes about ten (10) seconds. The data show that rapid PCR with integrated sample preparation can be used for point-of-care testing applications.

Rapid RT-PCR on SARS-CoV-2

To demonstrate the detection of a second viral pathogen, SARS-CoV-2 in nasal samples, a DMF cartridge with integrated heaters and sensors, and a "shuttling" reverse transcription qPCR (RT-qPCR) protocol configured for detecting SARS-CoV-2 RNA were used. Samples were obtained from Duke University. SARS-CoV-2 primer and probe sequences for RT-qPCR amplification of SARS-CoV-2 RNA and custom sequences for an internal control were also purchased from IDT Technologies (Coralville, IA), for example. All protocol steps for detecting SARS-CoV-2 RNA in the nasal samples were performed on the automated DMF cartridge.

Briefly, nasal swabs were collected in a viral transport medium, which may be loaded into sample reservoirs of the DMF cartridge. Subsequently, the user may initiate an automated real-time qPCR testing protocol for a virus such as SARS-CoV-2 detection in saliva samples.

Figure 16:
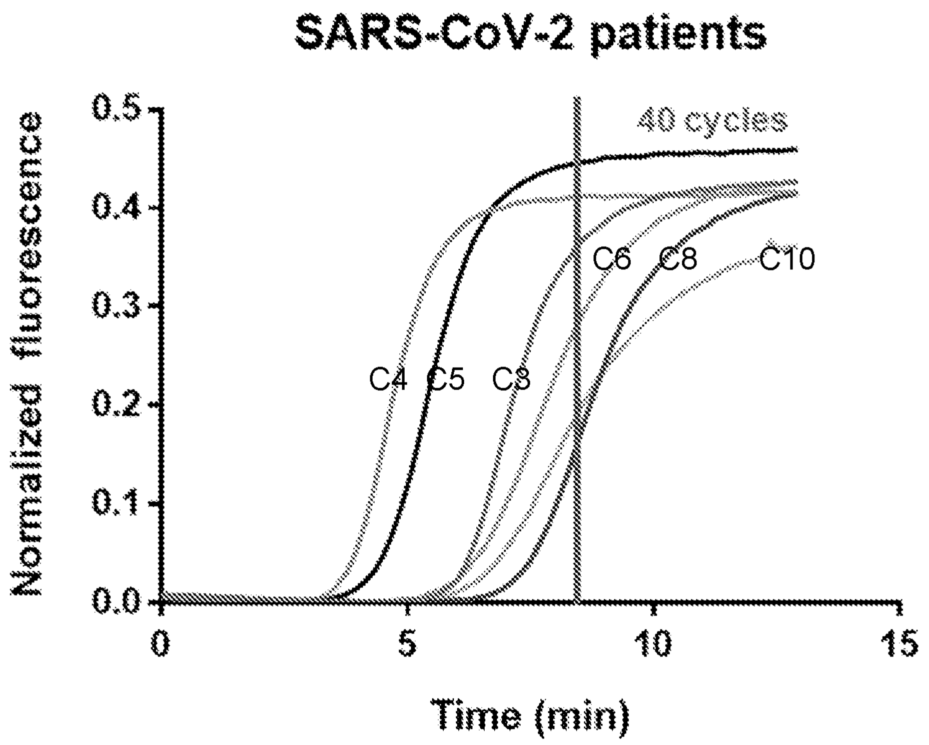
FIG. 16 shows a plot of normalized RFU versus time for saliva samples tested for SARS-CoV-2 RNA and using a shuttling PCR protocol.

FIG. 16 is a plot 1600 showing the normalized relative fluorescence unit (RFU) versus time for fourteen (14) adult nasal samples tested for SARS-CoV-2 RNA using a shuttling PCR protocol. The data show that all positive samples were amplified on-cartridge using the shuttling RT-qPCR DMF protocol. PCR for all samples was completed within fifteen (15) minutes. However, the data also show the inflection in the PCR curves for some of the positive samples takes less than about three (3) minutes. The data show that rapid PCR can be used for point-of-care testing applications.

Adaptation for Saliva Swab

In some embodiments, the DMF system 100, DMF cartridge 110, and/or workflow 1200 may provide DMF cartridge 110 configured for introducing a saliva (nasal, vaginal, and any other) swab directly onto DMF cartridge 110. An example of this is described hereinabove with reference to step 1210 of workflow 1200 shown in FIG. 12 and FIG. 13.

Integrated PCB-Integrated Structure

FIG. 17A through FIG. 17F are side views of an example process of forming the integrated PCB-integrated heater and sensor. For example, FIG. 17A through FIG. 17F show a process of forming a PCB substrate structure 1700. PCB substrate structure 1700 is an example of a structure used to form PCB substrate 200 that includes integrated heater/sensor arrangement 210 and electrode configuration 250. PCB substrate structure 1700 may be a four-layer PCB.

In this example, PCB substrate structure 1700 may include a sensor portion 1710, an electrode wiring portion 1712, an electrode portion 1714, and a heater portion 1716. In one embodiment, the electrode wiring portion may connect the electrodes to choose which electrodes are being activated. In another embodiment, the electrode portion and the electrode wiring portion may be on different layers to assist in creating a desirable spatial orientation. In one step and referring now to FIG. 17A, a layer of insulating or dielectric material 1720 with a copper layer 1722 on both sides is provided. Insulating or dielectric material 1720 may be, for example, the FR4 material of a standard PCB.

Figure 17A:
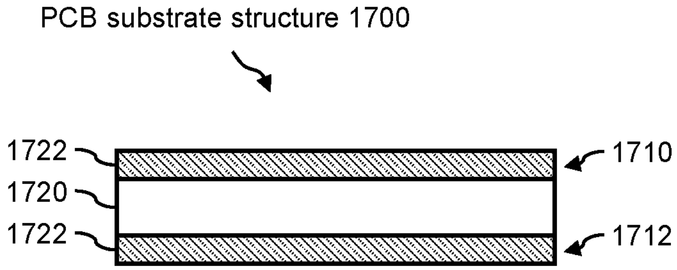
FIG. 17A through FIG. 17F illustrate a process of forming the integrated PCB-integrated heater and sensor.
Figure 17B:
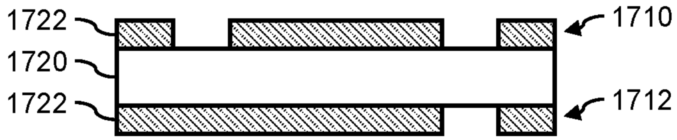

In another step and referring now to FIG. 17B, both copper layers 1722 are patterned using, for example, standard photolithography processes. Further, standard photolithography processes may be used throughout the steps shown and described in FIG. 17A through FIG. 17F. FIG. 17A and FIG. 17B show the beginning steps of forming sensor portion 1710 and electrode wiring portion 1712 of PCB substrate structure 1700.

Figure 17C:
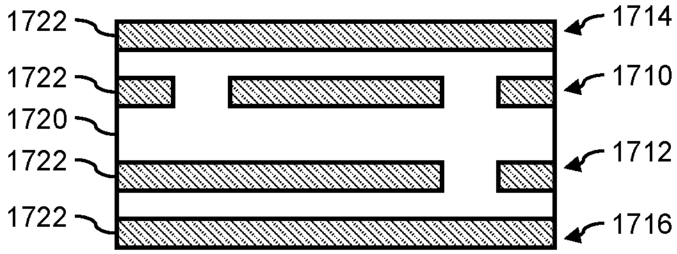

In another step and referring now to FIG. 17C, additional copper layers 1722 may be provided on both sides of the current structure and provide insulating or dielectric material 1720 where needed.

Figure 17D:
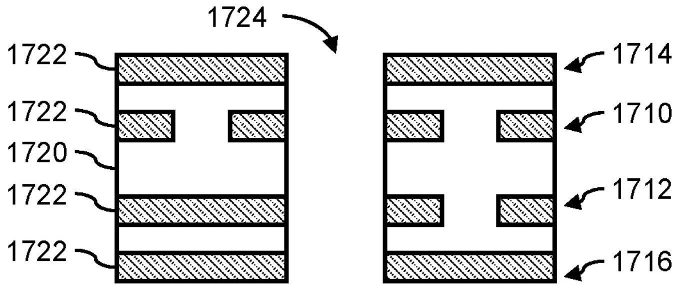

In another step and referring now to FIG. 17D, a through-hole 1724 is drilled through the current structure and at a location.

Figure 17E:
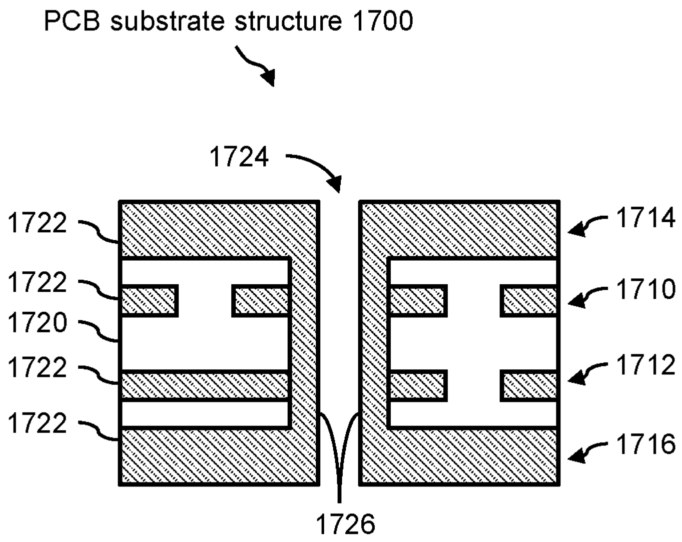

In another step and referring now to FIG. 17E, using, for example, an electroplating process, copper plating 1726 is applied to the through-hole 1724, which is now a copper-plated through-hole 1724.

Figure 17F:
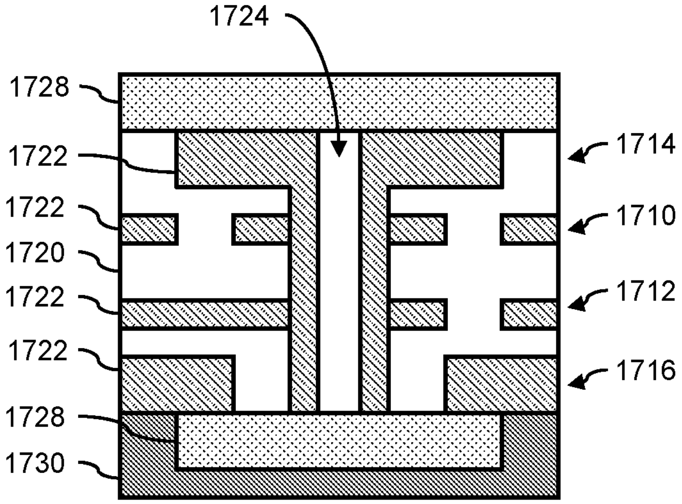

In another step and referring now to FIG. 17F, the outermost copper layers 1720 are patterned. This step substantially completes the formation of sensor portion 1710, electrode wiring portion 1712, electrode portion 1714, and heater portion 1716 of PCB substrate structure 1700. Then, a coverlay dielectric layer 1728 (e.g., KAPTON©) is provided on both sides of the structure. Then, a carbon layer 1730 is provided on the heater portion 1716-side of the structure. Carbon layer 1730 may be, for example, the carbon black material forming heater element 114 of the integrated PCB-integrated heater 112 of the heater/sensor arrangement 210 shown in FIG. 5A and FIG. 5B. In one example, the carbon black material may be an ink or ink blend applied using a screen-printing process and wherein the ink or ink blend may be selected to provide a resistance. The desired resistance of each of the heater elements 114 may be from about 80 ohms to about 120 ohms in one example or may be about 100 ohms in another example.

In another example and referring still to the step shown in FIG. 17F, carbon layer 1730, which is heater element 114, may be provided on the electrode portion 1714-side of the structure instead of on the heater portion 1716-side of the structure. In this example, a droplet may be sitting substantially directly atop carbon layer 1730 for very efficient heating because the heat need not flow through the thickness of the PCB. Further, it may be beneficial to minimize the distance between sensor portion 1710 (i.e., sensor trace 120), the heater portion 1716 (i.e., heater element 114), and the droplet. Accordingly, it may be beneficial to minimize the thickness of PCB substrate 200 by minimizing the distance between the multiple layers of PCB substrate 200.

In another example, carbon heater elements 114 may be screen-printed on the plastic top substrate (not shown) associated with PCB substrate 200 rather than on PCB substrate 200 itself. Poly(3,4-ethylenedioxythiophene) (PEDOT) is another example of heater material that may be printed on the top substrate. However, the presence of heater elements 114 on the top substrate requires wiring in the top substrate to control the heater elements 114.

Figure 18:
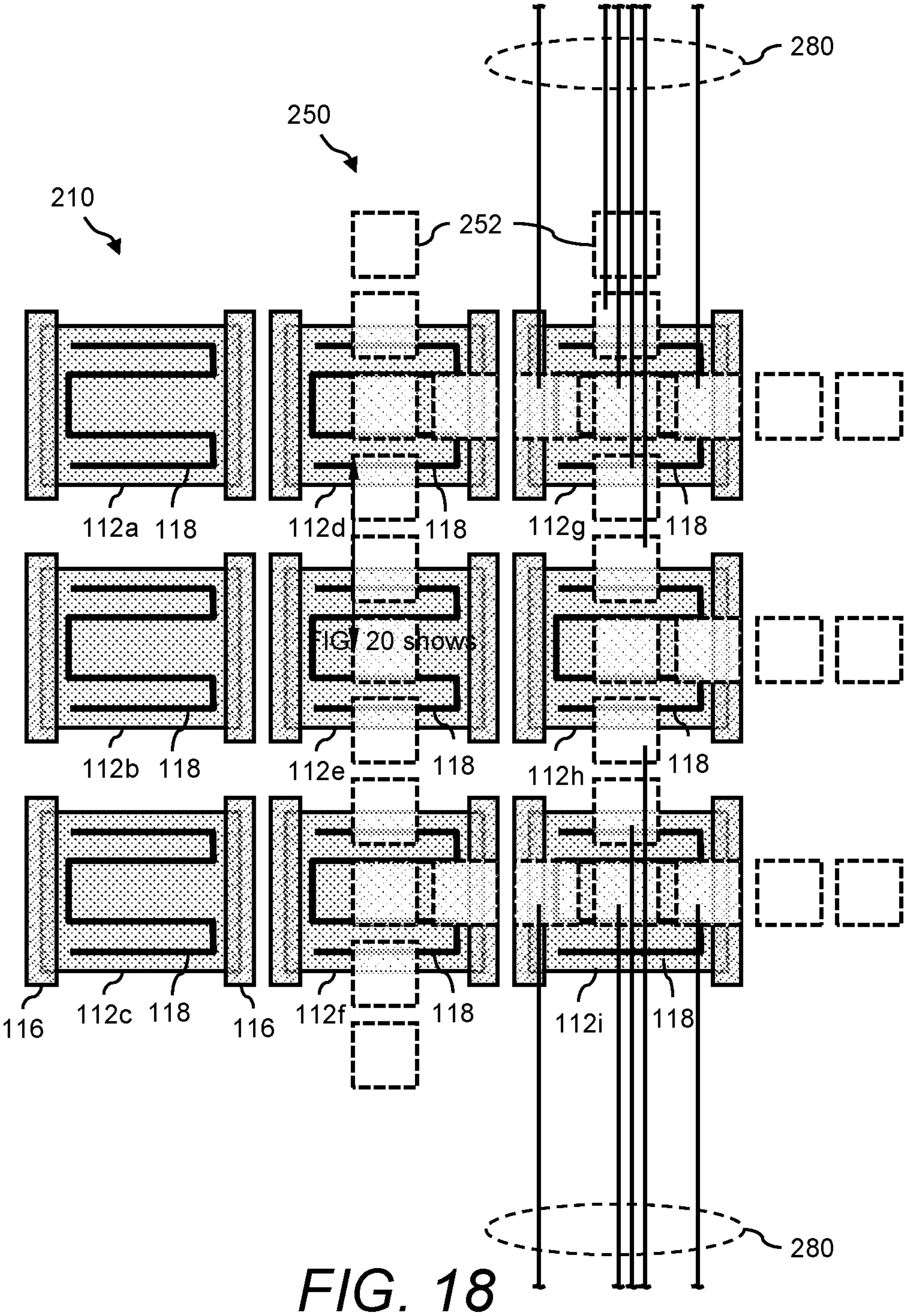
FIG. 18 is a close-up plan view of an example of the integrated heater/sensor portion of the DMF cartridge and an example of optimal wire routing.

To optimize the thermal characteristics of, for example, the integrated heater/sensor arrangement 210 of DMF cartridge 110, certain considerations may be made with respect to the wire routing within the PCB, such as within PCB substrate 200. For example, an important design consideration is that the wiring in the PCB should typically not be in the same direction as the heat gradients in the copper sensor traces 120 of PCB-integrated sensors 118. Rather, the wire routing should be orthogonal to the heat gradients in the copper sensor traces 120, as shown, for example, in FIG. 18. FIG. 18 shows an example of wires 280 running substantially orthogonal to the heat gradients present in the integrated heater/sensor arrangement 210. For example, to help maintain steep heat gradients it is desirable to minimize any inadvertent heat flowing through copper wires other than those forming integrated heater/sensor arrangement 210.

Further, the higher the resistance of the sensor trace 120 of any PCB-integrated sensor 118 the more sensitive the sensor. Therefore, another design consideration of PCB substrate 200 and/or the integrated heater/sensor arrangement 210 may be to (1) minimize the cross-section of the sensor traces 120 of PCB-integrated sensors 118, and (2) maximize the length of the sensor traces 120 of PCB-integrated sensors 118. For example, a 100-micron wide sensor trace 120 will have higher resistance than a 135-micron wide sensor trace 120 given the same thickness.

Figure 19:
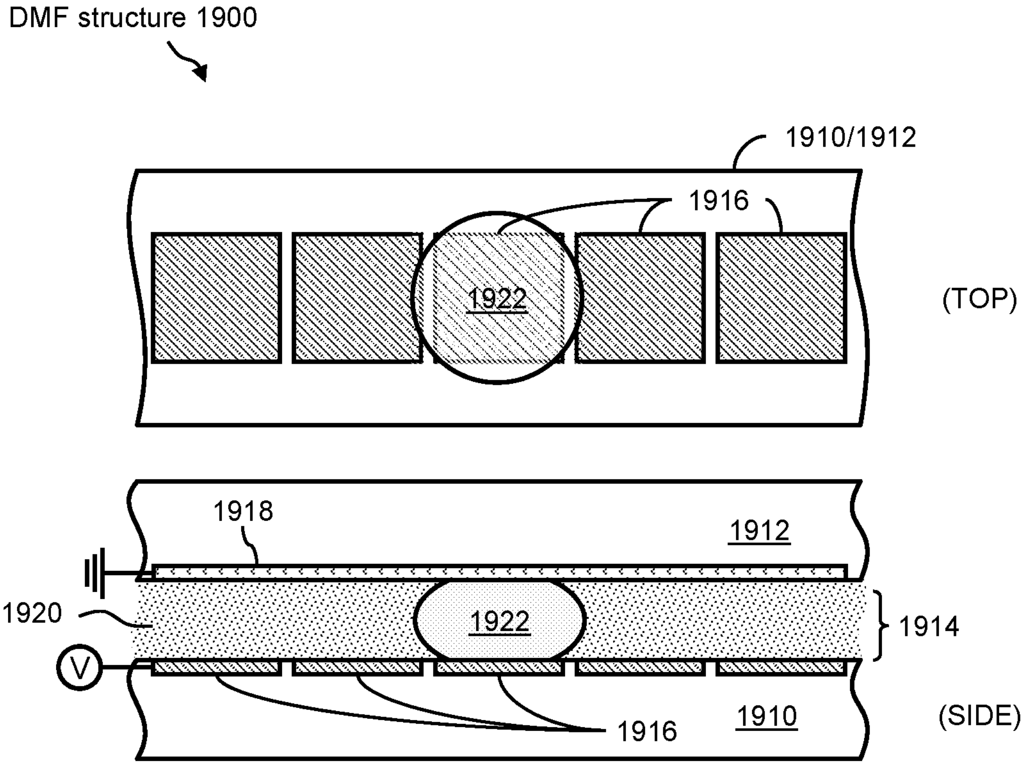
FIG. 19 is a top view and a side view of an example of a DMF structure including a standard biplanar design.

Referring now to FIG. 19 is a top view and a side view of an example of a DMF structure 1900 including a standard biplanar design with respect to the voltage and ground planes. DMF structure 1900 may include a bottom substrate 1910 and a top substrate 1912 separated by a droplet operations gap 1914. An arrangement of droplet operations electrodes 1916 (i.e., electrowetting electrodes) may be provided atop the bottom substrate 1910 and facing droplet operations gap 1914. In one example, droplet operations electrodes 1916 may be substantially square electrodes (e.g., 1 mm×1 mm). Further, a ground reference electrode 1918 may be provided at top substrate 1912 and facing the droplet operations gap 1914. Further, filler fluid 1920 (e.g., silicone oil) may be provided in the droplet operations gap 1914. FIG. 19 also shows an example of a droplet 1922 atop droplet operations electrodes 1916 in droplet operations gap 1914.

In this typical biplanar design, an electrowetting voltage V may be electrically connected to the droplet operations electrodes 1916 and a ground reference electrode 1918 may be electrically connected to the system ground. Accordingly, the electrowetting voltage V may be applied to droplet 1922 for performing droplet operations by virtue of the fact that droplet 1922 may be in contact with both bottom substrate 1910 and top substrate 1912, as shown.

Certain and perhaps non-optimal thermal gradients may be present in the standard biplanar DMF design with respect to, for example, the integrated heater/sensor arrangement 210 of PCB substrate 200. Other DMF designs may be better suited for optimizing the thermal gradients therein.

Figure 20:
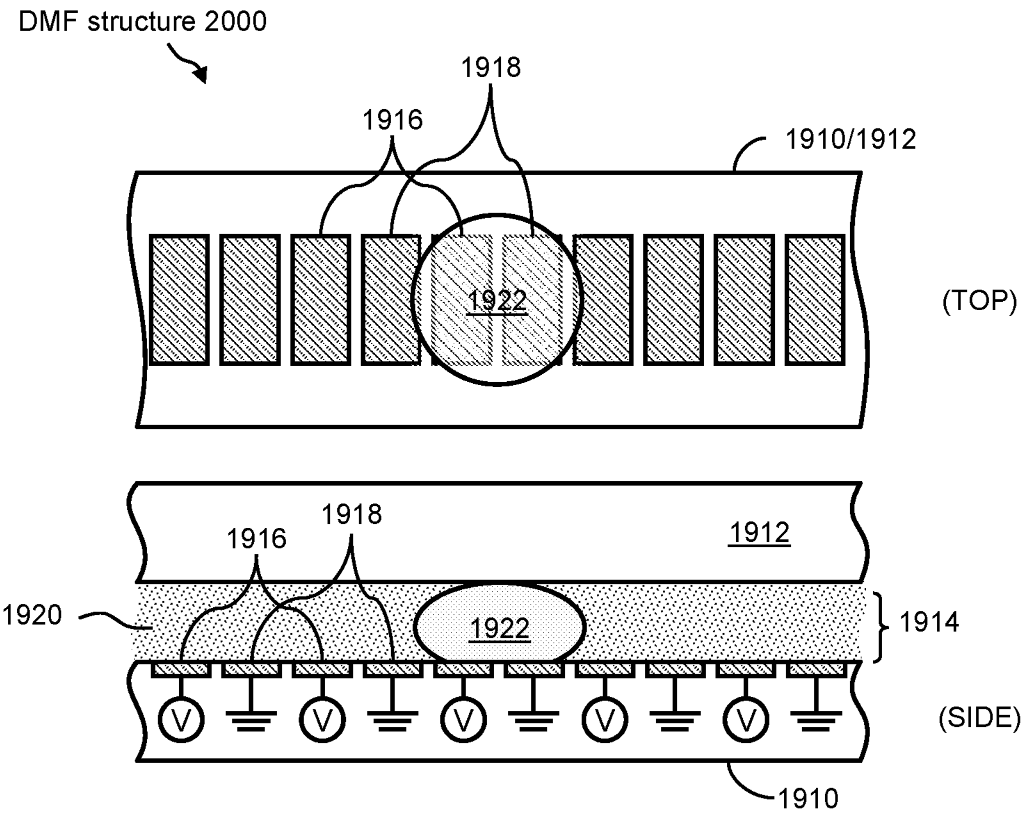
FIG. 20 is a top view and a side view of an example of a DMF structure including a coplanar design that may be useful with respect to ensuring a suitable heat gradient in the DMF cartridge of the DMF system.

For example, FIG. 20 is a top view and a side view of an example of a DMF structure 2000 including a coplanar design with respect to the voltage and ground planes. The coplanar design shown in DMF structure 2000 may be useful with respect to optimizing the thermal gradients within, for example, DMF cartridge 110 of the DMF system 100.

DMF structure 2000 is substantially the same as DMF structure 1900 shown in FIG. 19 except that the top substrate 1912 does not include the ground reference electrode 1918 and droplet operations electrodes 1916, as shown in FIG. 19, and each of the substantially square droplet operations electrodes 1916 is replaced with a pair of "half-size" droplet operations electrodes. For example, each pair of "half-size" droplet operations electrodes may include a "half-size" droplet operations electrode 1916 and a "half-size" ground reference electrode 1918. In one example, each of the "half-size" droplet operations electrodes may be about 1 mm×0.5 mm.

In this coplanar design, the electrowetting voltage V may be electrically connected to each of the "half-size" droplet operations electrodes 1916. Further, each of the "half-size" ground reference electrodes 1918 may be electrically connected to the system ground. Accordingly, the electrowetting voltage V may be applied to a droplet 1922 for performing droplet operations by virtue of the fact that droplet 1922 spans both a "half-size" droplet operations electrode 1916 and a "half-size" ground reference electrode 1918. In this example, droplet 1922 may or may not be in full contact with the top substrate 1912.

The "half-size" droplet operations electrodes allow the inter-electrode spacing to be reduced compared with standard biplanar designs, which may assist to provide and/or ensure a high thermal gradient across the droplet operations electrodes. This high thermal gradient across electrodes may be useful with respect to thermal cycling droplets in in-place and/or shuttling PCR protocols.

In some embodiments, the DMF system 100 and/or DMF cartridge 110 may include fluorescence to perform temperature sensing in place of the sensor trace 120 in each of the PCB-integrated sensors 118. In one example, fluorescent dyes may be bound to a double-stranded DNA sequence of a melting temperature. As temperature approaches the melting temperature, double-stranded DNA is converted to single-stranded DNA which results in a loss of fluorescence due to decreased binding affinity to the fluorescent dye. In another example, the PCB-integrated sensors 118 may include temperature-responsive fluorescent dye (see U.S. Pat. No. 9,850,549 B2). In this example, another fluorimeter channel may be needed to monitor the dye and determine the temperature.

"A," "an," and "the" refer to "one or more" when used in this application, including the claims. Thus, for example, reference to "a subject" includes a plurality of subjects, unless the context clearly is to the contrary (e.g., a plurality of subjects), and so forth.

"Comprise," "comprises," "comprising," "include," "includes," and "including," are intended to be non-limiting, such that recitation of items in a list is not to the exclusion of other like items that may be substituted or added to the listed items.

"Preferably," "commonly," and "typically" are not utilized herein to limit the scope of the claimed embodiments or to imply that certain features are critical or essential to the structure or function of the claimed embodiments. These terms are intended to highlight alternative or additional features that may or may not be utilized in a particular embodiment of the present disclosure.

"Substantially" is used herein to represent the inherent degree of uncertainty that may be attributed to any quantitative comparison, value, measurement, or other representation and to represent the degree by which a quantitative representation may vary from a stated reference without resulting in a change in the basic function of the subject matter at issue.

Various modifications and variations of the disclosed methods, compositions, and uses of the invention will be apparent to the skilled person without departing from the scope and spirit of the invention. Although the invention has been disclosed in connection with specific preferred aspects or embodiments, the invention as claimed should not be unduly limited to such specific aspects or embodiments.

The invention may be implemented using hardware, software, or a combination thereof and may be implemented in one or more computer systems or other processing systems. In one aspect, the invention is directed toward one or more computer systems capable of carrying out the functionality described herein.

Unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount, or range. Accordingly, unless indicated to the contrary, the numerical parameters set forth in the following specification and attached claims are not and need not be exact but may be approximate and/or larger or smaller as desired, reflecting tolerances, conversion factors, rounding off, measurement error and the like, and other factors known to those of skill in the art depending on the desired properties sought to be obtained by the subject matter.

For example, the term "about," when referring to a value can be meant to encompass variations of, in some embodiments±100%, in some embodiments±50%, in some embodiments±20%, in some embodiments±10%, in some embodiments±5%, in some embodiments±1%, in some embodiments±0.5%, and in some embodiments±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct a more specialized apparatus to perform the required method steps. The required structure for a variety of these systems will appear as set forth in the description above.

In some alternative implementations, the functions/acts noted may occur out of the order noted in the figures. For example, two (2) figures shown in succession may in fact be executed substantially concurrently or may sometimes be executed in the reverse order, depending upon the functionality/acts involved.

Although the method operations were described in a specific order, other operations may be performed in between described operations, described operations may be adjusted so that they occur at slightly different times, or the described operations may be distributed in a system that allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on).

Additionally, "configured to" or "configurable to" can include generic structure (e.g., generic circuitry) that is manipulated by software and/or firmware (e.g., an FPGA or a general-purpose processor executing software) to operate in a manner that can perform the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or another unprogrammed device, unless accompanied by programmed media that confers the ability to the unprogrammed device to be configured to perform the disclosed function(s).

Although the foregoing subject matter has been described in some detail by way of illustration and example for purposes of clarity of understanding, it will be understood by those skilled in the art that certain changes and modifications can be practiced within the scope of the appended claims.

We claim:

1. A method of thermal cycling a droplet, the method comprising:

(a) providing a droplet actuator comprising:

(i) two or more integrated heaters establishing an integrated heater/sensor arrangement, and comprising a first integrated heater and sensor pair, and establishing at least a first thermal zone and a second integrated heater and respective sensor pair establishing a second thermal zone droplet operations gap, wherein the integrated heater sensor/arrangement provides closed-loop thermal control, and wherein the droplet operations gap is optionally substantially oil filled;

(ii) a thermal cycling path comprising a plurality of droplet operations electrodes comprising a first droplet operations electrode designated as a first detection electrode in the first thermal zone and a second droplet operations electrode in the second thermal zone, wherein the first and second droplet operations electrodes are within 5 mm of each other;

(iii) a first temperature at the first droplet operations electrode and a second temperature at the second droplet operations electrode, wherein the first and second temperatures differ by at least about 10° C.;

(iv) two or more integrated sensors, configured to, in part, measure the two or more heaters and/or the first thermal zone and the second thermal zone, and wherein the two or more integrated heaters and the two or more integrated sensors form at least a first heater/sensor arrangement pair and a second heater/sensor arrangement pair corresponding to at least the first thermal zone and the second thermal zone, wherein the two or more heater/sensor arrangement pairs are configured for micro-regional thermal control of at least the first thermal zone and the second thermal zone;

(b) using the droplet operations electrodes, transporting the droplet in a cycling pattern for multiple cycles along the thermal cycling path between the first droplet operations electrode and the second droplet operations electrode.

2. The method of claim 1 wherein:

(a) the droplet comprises reagents for amplifying a nucleic acid;

(b) the first temperature is a denaturation temperature and the second temperature is an elongation temperature; and (c) the transporting the droplet in a cycling pattern results in nucleic acid amplification.

3. The method of claim 1 wherein the droplet actuator comprises 2 or more of the thermal cycling path.

4. The method of claim 1 wherein the first droplet operations electrode is adjacent to the second droplet operations electrode, without any intervening droplet operations electrode.

5. The method of claim 1 wherein the first and second droplet operations electrodes are separated by no more than one additional droplet operations electrode between them.

6. The method of claim 1 wherein the first and second droplet operations electrodes are separated by no more than two additional droplet operations electrodes between them.

7. The method of claim 2 wherein each cycle of the multiple cycles is completed in less than about 1 seconds and effects substantially complete amplification.

8. The method of claim 2 wherein each cycle of the multiple cycles is completed in less than about 0.5 seconds and effects substantially complete amplification.

9. The method of claim 1 wherein the thermal cycling path has a length of less than about 5,000 μm.

10. The method of claim 1 wherein the thermal cycling path has a length of less than about 100 μm.

11. The method of claim 1 wherein the thermal cycling path has a length of less than about 10 μm.

12. The method of claim 1 wherein transporting the droplet between the first droplet operations electrode and the second droplet operations electrode is accomplished in a time of about 100 milliseconds or less.

13. The method of claim 1 wherein transporting the droplet between the first droplet operations electrode and the second droplet operations electrode is accomplished in a time of about 50 milliseconds or less.

14. The method of claim 1 wherein transporting the droplet between the first droplet operations electrode and the second droplet operations electrode is accomplished in a time of about 25 milliseconds or less.

15. The method of claim 1 wherein:

(a) the first thermal zone is set at a nucleic acid annealing temperature; and (b) the second thermal zone is set at a nucleic acid denaturation temperature.

16. The method of claim 15 wherein the method comprises retaining the droplet at the first droplet operations electrode for a period of about 500 milliseconds or less.

17. The method of claim 15 wherein the method comprises retaining the droplet at the first droplet operations electrode for a period of about 0 seconds.

18. The method of claim 15 wherein the method comprises retaining the droplet at the second droplet operations electrode for a period of about 500 milliseconds or less.

19. The method of claim 15 wherein the method comprises retaining the droplet at the second droplet operations electrode for a period of about 0 seconds.

20. The method of claim 1 wherein each cycle takes less than about 1 seconds.

21. The method of claim 1 wherein each cycle takes less than about 0.5 seconds.

22. The method of claim 1 wherein the heaters are arranged such that:

(a) a first heater is associated with the first droplet operations electrode and establishes the first thermal zone;

(b) a second heater is associated with the second droplet operations electrode and establishes the second thermal zone; and (c) a third heater is associated with a boundary region adjacent to the second heater and is set at a temperature selected to maintain the temperature of the second thermal zone.

23. The method of claim 22 wherein the second heater and the third heater are set at the same temperature.

24. The method of claim 22 wherein the second heater and the third heater are set at a higher temperature than the first heater.

25. The method of claim 22 wherein the second heater and the third heater are set at a denaturation temperature.

26. The method of claim 22 wherein the third heater stabilizes the second thermal zone.

27. The method of claim 1 wherein the one or more integrated sensors are arranged for sensing temperature of the thermal zone, wherein each of the one or more sensors corresponds to each of the one or more integrated heaters.

28. The method of claim 27 wherein the one or more sensors are calibrated to measure temperature in the range of room temperature to 100° C.

29. The method of claim 27 wherein the one or more sensors are each situated to measure temperature within in close proximity to the droplet.

30. The method of claim 27 wherein the one or more sensors are each situated to measure temperature at a distance of about 1 mm or less from the droplet.

* * * * *